United States Patent [19]
Shiraishi

[11] Patent Number: 5,828,401
[45] Date of Patent: Oct. 27, 1998

[54] LASER BEAM EXPOSING UNIT HAVING PLASTIC NON-SPHERICAL LENSES BETWEEN A SCANNER AND AN IMAGE BEARER

[75] Inventor: Takashi Shiraishi, Sagamihara, Japan

[73] Assignee: Kabushiki Kaisha Toshiba, Kawasaki, Japan

[21] Appl. No.: 632,144

[22] Filed: Apr. 15, 1996

Related U.S. Application Data

[63] Continuation of Ser. No. 266,679, Jun. 28, 1994, abandoned.

[30] Foreign Application Priority Data

Jun. 28, 1993 [JP] Japan ..................................... 5-157576

[51] Int. Cl.⁶ .............................. B41J 2/47; G01D 15/14; G02B 26/00; G02B 27/00
[52] U.S. Cl. .......................... 347/259; 347/260; 347/258
[58] Field of Search ..................................... 347/134, 137, 347/241, 244, 245, 253, 258, 259, 260, 257, 261

[56] References Cited

U.S. PATENT DOCUMENTS 5,159,193  10/1992  Shiraishi et al. ....................... 250/236

FOREIGN PATENT DOCUMENTS

| 2-120819 | 5/1990 | Japan . |
| 4-110818 | 4/1992 | Japan . |
| 4-110819 | 4/1992 | Japan . |

*Primary Examiner*—Benjamin R. Fuller
*Assistant Examiner*—Raquel Yvette Gordon
*Attorney, Agent, or Firm*—Foley & Lardner

[57] ABSTRACT

A laser beam printer of the present invention has a laser exposing unit including apochromatical plastic cylinder lenses being integrally formed by adhesion of plastic of the same material as a fθ lens or molding, having negative power in a sub-scanning direction, a substantially flat surface contacting air, and first and second fθ lenses in which surfaces other than a toric surface are displaced in the same direction in the sub-scanning direction and a toric surface is displaced in the direction opposite to the other surfaces in the sub-scanning direction and a different inclination is provided for each of the lenses. The plastic cylinder lens and the glass cylinder lens may be inversely arranged.

16 Claims, 16 Drawing Sheets

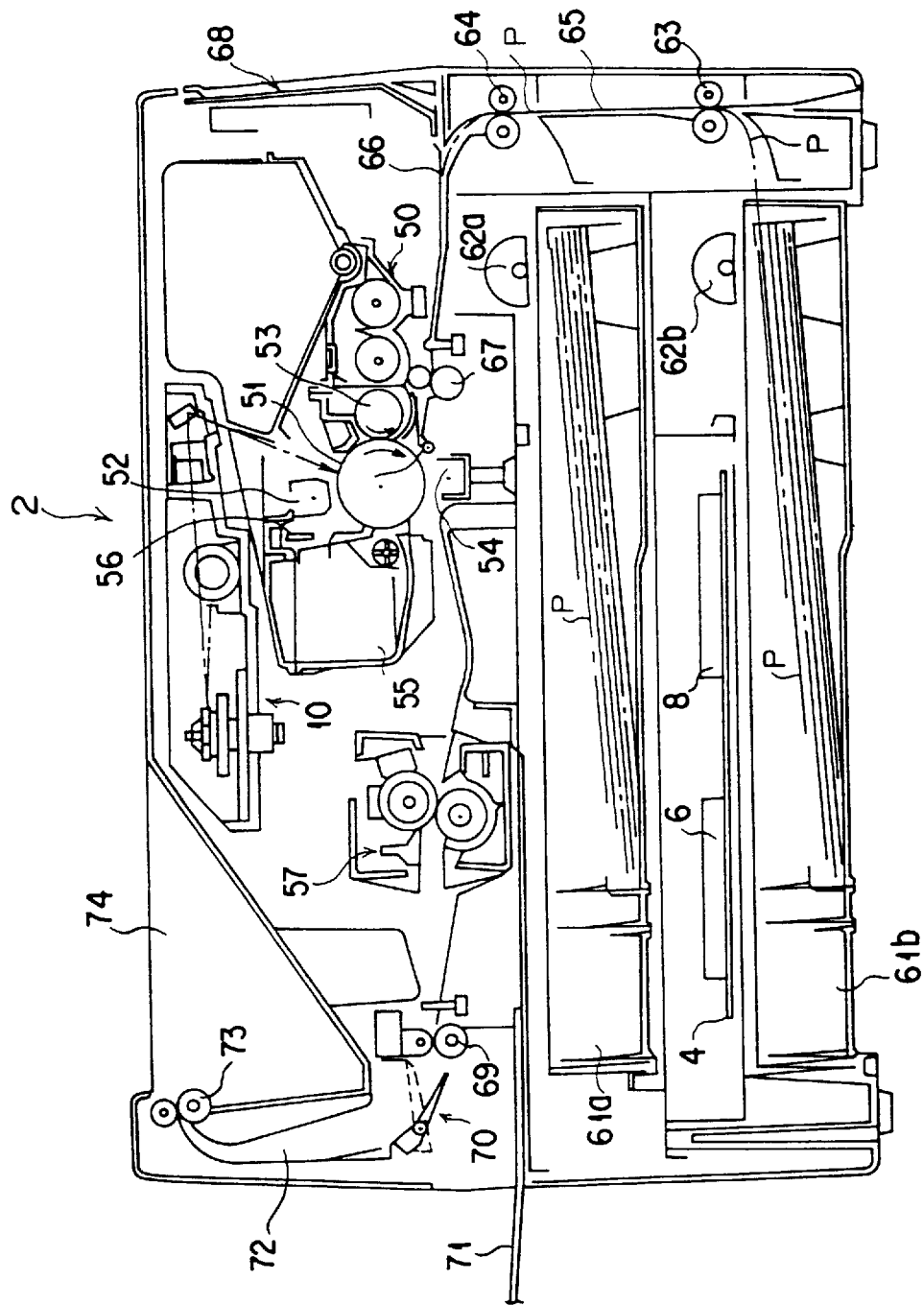
F I G. 2

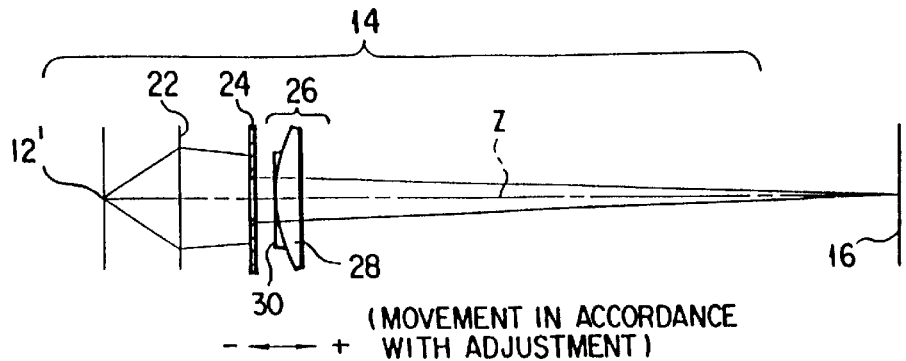
F I G. 3
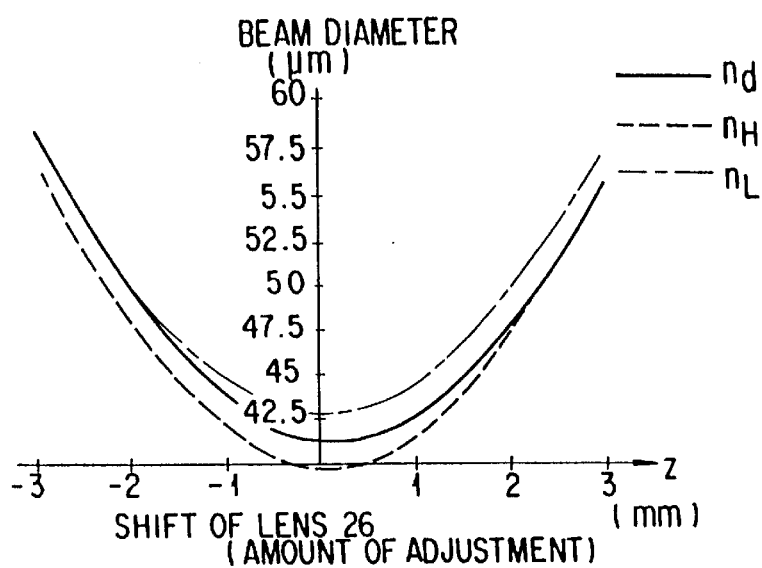
F I G. 4
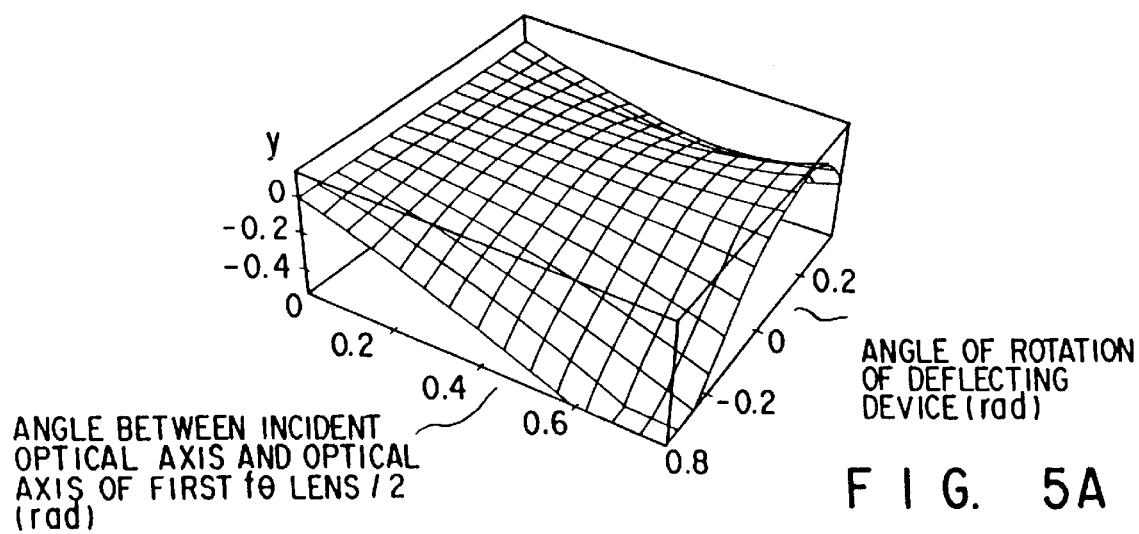
F I G. 5A

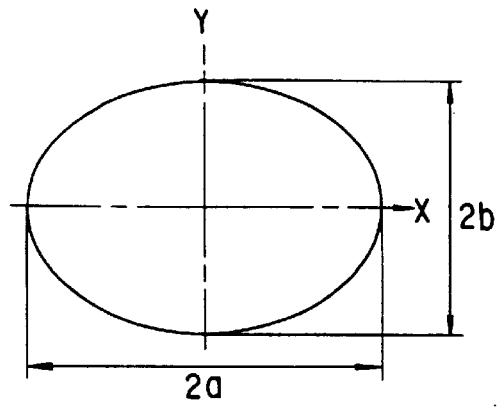
F I G. 14A
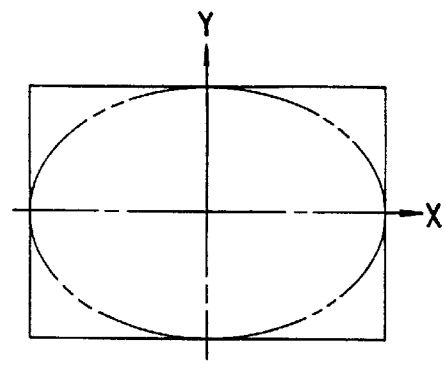
F I G. 14B
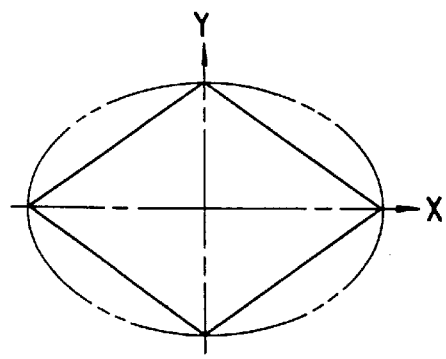
F I G. 14C
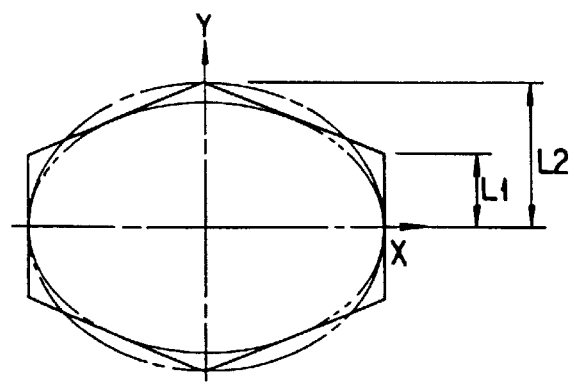
F I G. 14D

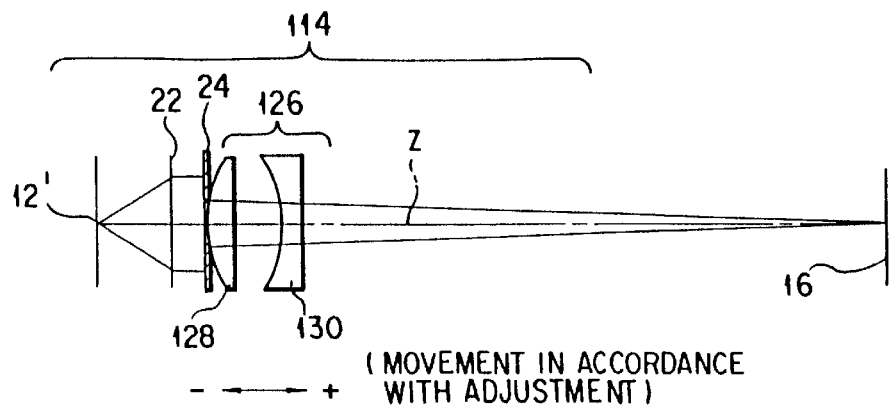
F I G. 15
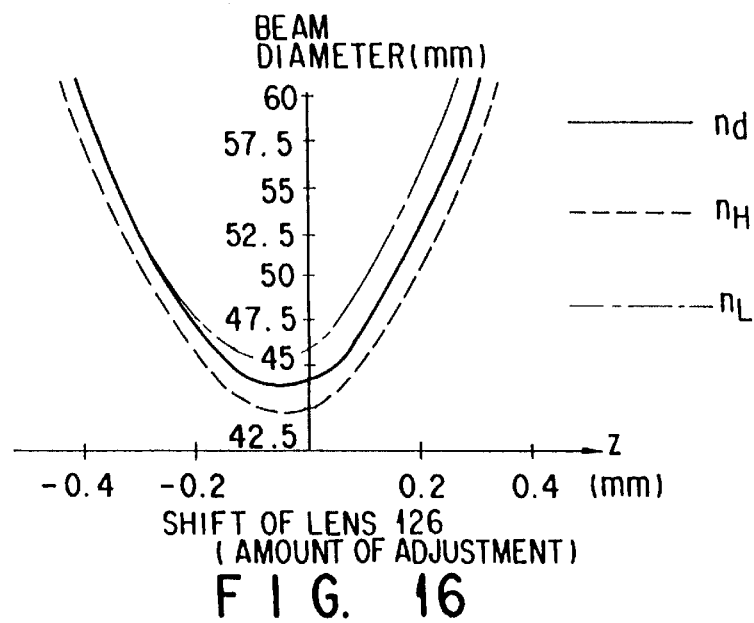
F I G. 16
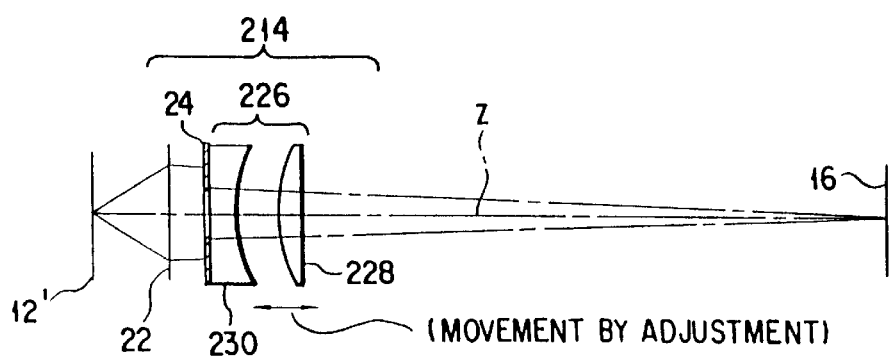
F I G. 17

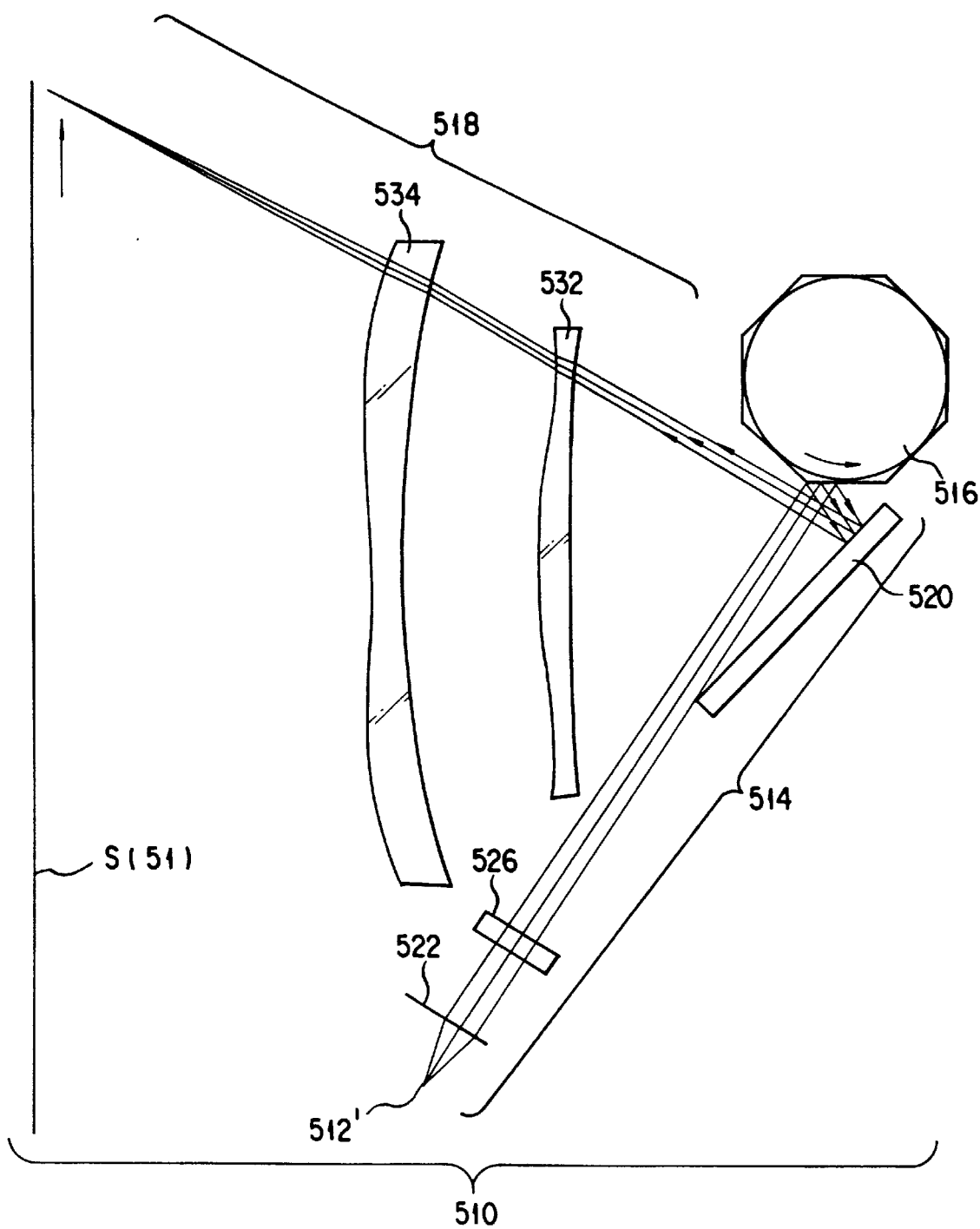
F I G. 24

LASER BEAM EXPOSING UNIT HAVING PLASTIC NON-SPHERICAL LENSES BETWEEN A SCANNER AND AN IMAGE BEARER

This application is a continuation of application Ser. No. 08/266,679, filed Jun. 28, 1994, now abandoned.

BACKGROUND OF THE INVENTION

1. Field of the Invention

This invention relates to an optical unit and more particularly to a laser beam exposing unit, which is used in a laser beam printer and scans a laser beam to a photosensitive drum.

2. Description of the Related Art

A laser beam printer in which an electrophotography process is used includes a photosensitive drum on which an image is formed based on image data, a laser exposing unit for exposing an image, which is based on image data, on the photosensitive drum, a developing unit for developing the image formed on the photosensitive drum, and a paper transfer unit for transferring the image, which is developed on the photosensitive drum, to paper.

For example, in a laser beam printer of a reverse developing method, the photosensitive drum is charged to about −500 to −700V. A laser beam, which is based on image data, is irradiated on to the charged photosensitive drum through the laser exposing unit. Thereby, an electrostatic latent image is formed on the area where the laser beam is irradiated. The electrostatic latent image is developed by toner supplied from the developing unit.

The laser exposing unit has a semiconductor, serving as a light source, an optical system for a light source side (pre-deflection optical system) for reducing a beam diameter of a cross section of the laser beam sent from the semiconductor laser to a predetermined size, a deflecting device for deflecting the laser beam whose cross-section is reduced to the predetermined size along an axis of the photosensitive drum, and an image-forming optical system (post-deflection optical system) for arranging the laser beam deflected by the deflecting device to a substantially constant beam diameter regardless of a distance of an axial direction of the photosensitive drum and for focusing the laser beam toward a predetermined position, which proportioned by an angle of the laser beam is deflected, on the photo-sensitive drum. In general, a direction where the laser beam is deflected by the deflecting device, that is, a direction, which is parallel to the axial direction of the photosensitive drum, is called as a main-scanning direction, and a direction, which is perpendicular to the main-scanning direction, is called as a sub-scanning direction.

The pre-deflection optical system has a collimator lens (or a finite lens) formed of glass or plastic in order to provide a focusing property to the divergent laser beam from the laser, and a parallel laser beam or a focus laser beam having a focusing property.

The deflecting device has a reflecting surface, which is rotatably formed. The reflecting surface is rotated in a predetermined direction, thereby deflecting the laser beam passed through the pre-deflection optical system.

The post-deflection optical system has an fθ lens (includes a kind of a toroidal lens) formed of plastic (rarely, glass).

In the laser exposing unit incorporated into the laser beam printer, it is desirable that the beam diameter of the laser beam arrived at the photosensitive drum and the position at which the laser beam is arranged be not be varied by the change of a temperature and that of humidity. Therefore, mostly, the lens to be used in the laser exposing unit is formed of optical glass. On the other hand, in a glass lens, it has been known that the manufacture cost is higher than the plastic lens since it is difficult to process the weight and complicated shape.

When the plastic lens is used, it is known that the beam diameter of the laser beam to reach the photosensitive drum is largely changed by the change of temperature or that of humidity.

For example, Japanese Patent Application KOKAI Publication No. 4-110818 discloses an example using a collimator lens in the pre-deflection optical system and a plastic lens in the post-deflection optical system. According to this example, the distance between the collimator lens and the semiconductor laser is corrected by use of thermal expansion of a lens-barrel. However, in this example, there is a problem in that the variations of the arrival position of the laser beam in the main-scanning direction and in the sub-scanning direction, which are caused by the change of the temperature, cannot be stopped at the same time. Moreover, in this example, expansion of the lens and the change of the refractive index due to moisture absorption are not considered.

Separately from the above, the plastic lens is mostly formed to be an aspherical lens or asymmetrical lens. Moreover, there is proposed a method in which an aspherical lens is displaced against an optical axis. However, for using the aspherical lens or asymmetrical lens, there are needed high accuracy of the position in the case that the lens is fixed, high accuracy of processing the plane of incidence and the plane of emission as a unit, and high accuracy of the displacement of the position between the plane of incidence and that of emission. Furthermore, in the case that the finite lens is used, the property of asymmetry of a filed curve is increased by the movement of deflecting point as rotation of a rotatable polygonal mirror in order not to change the position of the image-formation in the main-scanning direction when the temperature or humidity is changed.

For example, in Japanese Patent Application KOKAI Publication No. 4-110818, there is used a post-deflection optical system into which a deflecting device using a spherical mirror, and a lens including a toric surface in which the surface of incidence and that of emission are eccentric to the main-scanning direction are incorporated. In this example, variation of the surface of the image-formation due to the change of the temperature is not considered, and a collimate lens is used. However, in the case that the finite lens is used, it is difficult to correct the filed curve only by the decentering to the the main-scanning direction.

Japanese Patent Application KOKAI Publication No. 4-110819 discloses an example in which, in the optical system into which a spherical mirror and a lens formed of a spherical surface and a toric surface are incorporated, the spherical mirror is eccentrically provided in sub-scanning direction and the spherical surface of the lens is provided in the sub-scanning direction to be eccentric to the toric surface. However, this method aims to separate a reflection light, which is sent from the spherical mirror, and a laser beam to the lens. Therefore, for keeping linearity in a state that the laser beam is not passed through the center of the axisymmetric and asymmetrical lens by use of the plastic lens, correction only by decentering is insufficient.

On the other hand, in the plastic lens, since the thermal expansion coefficient is large, a difference between the plastic lens and coating material in degree of expansion is large, thereby making it difficult to perform reflection reducing coating. Moreover, in the case that the lens surface is axisymmetically formed, the coarseness of the surface is increased in the vicinity of the axis and a projection is generated at a central portion by influence of a cutting speed of a lathe for manufacturing a mold. In this case, for performing the reflection reducing coating, there is a problem in that a special coating technique is required and cost is increased. Also, in a technique such as polishing the lens surface to change an optical property provided by the complicated shape, there occurs a new problem in that the beam diameter of the laser beam to be image-formed onto the photosensitive drum, the shape of the beam, or the linearity are deteriorated.

In the case of the deflecting device, even if the number of rotations of the motor for rotating the reflecting mirror reaches the limit, the printing speed can be improved by increasing the number of planes of reflection. However, increase in the number of planes of reflection limits the angle (angle of deflection), at which the laser beam can be deflected. As a result, there occurs a new problem in that the length of an optical path is increased and the size of the laser exposing unit is increased.

SUMMARY OF THE INVENTION

According to a first aspect of the present invention, there is provided an apparatus for exposing a light beam on an image bearing member, comprising: means for deflecting light from a light source toward the image bearing member; first optical lens means, provided between the light source and the deflecting means, for converting a cross sectional shape of light toward the deflecting means; and second optical lens means, provided between the deflecting means and the image bearing member, for image-forming light deflected by the deflecting means, wherein the first optical lens means has lens power in the main-scanning direction such that distance between a deflecting point of the deflecting means and an image forming point in the main-scanning direction where light deflected by the deflecting means is image-formed at the center of a deflection angle when a lens surface is replaced with a plane is shorter than a distance between the deflecting point of the deflecting means and an end portion of the image bearing member when the second optical lens means is a predetermined curvature.

According to a second aspect of the present invention, there is provided an apparatus for exposing a light beam on an image bearing member, comprising: means for deflecting light from a light source toward the image bearing member; first optical lens means, provided between the light source and the deflecting means, for converting a cross sectional shape of light toward the deflecting means; second optical lens means including first and second plastic lenses having an incident lens surface and an emission lens surface, wherein a) a shape of a generating profile of each of the incident lens surface and the emission lens surface of the respective first and second plastic lenses is defined by $z=gi(y)$; wherein z: a position of a direction along the optical axis when a crossing point of the optical axis passing the lens surface of one of first and second plastic lenses and the lens surface is set as an origin, y: position in the coordinates system where the lens surface which is along an axis substantially parallel to a plane including the deflecting direction by the deflecting means, i: the number of corresponding lens surfaces, b) in the first and second derivatives of the incident lens surface and the emission lens surface of at least one lens, at the position other than the position where the optical axis of the main-scanning direction and the lens surface are crossed, the size relation larger or smaller derivative surface is inverted at a predetermined distance, c) the first and second derivatives of each surface of a lens and first and second derivatives of the other lens are defined to be in substantially opposite relation to the value of y corresponding to each position where the same light beam is passed.

According to third aspect of the present invention, there is provided an apparatus for exposing a light beam on an image bearing member, comprising: means for deflecting light from a light source toward the image bearing member; first optical lens means, provided between the light source and the deflecting means, for converting a cross sectional shape of light toward the deflecting means; second optical lens means including first and second plastic lenses having an incident lens surface and an emission lens surface, wherein the second optical lens means includes a first lens whose incident lens surface and emission lens surface are formed to be spherical or aspherical, and a second lens whose incident lens surface and emission lens surface are formed to have a toric surface and an aspherical surface, respectively, and each optical axis passing through each lens surface other than the toric surface is displaced to the direction perpendicular to the plane including the direction deflected by the deflecting means against light deflected at the center of a deflection angle of the deflecting means.

According to a fourth aspect of the present invention, there is provided an apparatus for exposing a light beam generated from a light source on an image bearing member, comprising: means for deflecting the light beam generated from the light source to the image bearing member; first optical lens means, provided between the light source and the deflecting means, for converting a cross sectional shape of the light beam generated from the light source, the first optical means having a glass lens, a plastic cylinder lens having negative power in a direction perpendicular to a direction where the light beam is deflected by the deflecting means, and a glass cylinder lens having positive power in a direction perpendicular to a direction where the light beam is deflected by the deflecting means; and second optical means, provided between the deflecting means and the image bearing member, for image-forming the light beam deflected by the deflecting means, the second optical means having a plastic toric lens having a toric surface and positive power in the sub-scanning direction.

According to a fifth aspect of the present invention, there is provided an apparatus for exposing a light beam on an image bearing member, comprising: a light source for generating light; means for deflecting light from the light source toward the image bearing member; first optical lens means, provided between the light source and the deflecting means, for converting a cross sectional shape of light toward the deflecting means; means, provided between the deflecting means and the image bearing member, for reflecting light deflected by the deflecting means, thereby reducing a substantial distance between the deflecting means and the image bearing member; and second optical lens means, provided between the deflecting means and the image bearing member, including an aspherical plastic lens and an aspherical toric lens, for image-forming light deflected by the deflecting means.

According to a sixth aspect of the present invention, there is provided an apparatus for exposing a light beam on an image bearing member, comprising: means for deflecting light from a light source toward the image bearing member; first optical lens means, including a plurality of lenses and an aperture stop, for converting a cross sectional shape of light toward the deflecting means; second optical lens means, provided between the deflecting means and the image bearing member for image-forming light deflected by the deflecting means, wherein the aperture stop of the first optical lens means has an opening having a shape such that a beam diameter at the image bearing member is set to be small in a state that the aperture stop is detached with respect to a first direction and to be large in a state that the aperture stop is attached, and the opening has areas at its outside in an area nearby to a symmetrical axis in the first direction and oblique areas at its inside in an area nearby to a symmetrical axis in a second direction against an ellipse including a crossing point of the symmetry axis of the first direction and that of the second direction perpendicular to the first direction with the symmetry axis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a schematic cross sectional view showing an image forming device into which the laser exposing unit of FIG. 1 is incorporated;

FIG. 3 is a schematic view of the optical path showing a position of a lens in a sub-scanning direction of a pre-deflection optical system in the laser exposing unit of FIG. 1;

FIG. 4 is a graph showing a beam diameter in the sub-scanning direction at a central portion of an image surface (surface to be scanned) when a refractive index is varied by the change of temperature or humidity in the laser exposing unit of FIG. 1;

FIGS. 5A and 5B are graphs each showing a position of a reflection point in the deflecting device in normalizing an inscribed circle radius of a reflected surface of the deflecting device to 1;

FIGS. 14A to 14D are front views each showing a diaphragm of the stops incorporated into the pre-deflection system of the optical system of FIG. 1;

FIG. 15 is a view of an optical path showing another embodiment of the pre-deflection optical system of FIG. 3;

FIG. 16 is a graph showing a beam diameter in the sub-scanning direction at the central portion of a theoretical image formation surface in the pre-deflection optical system of the laser exposing unit of FIG. 15 when a shift of the position of a cylinder lens and a refractive index are varied by the change of temperature or humidity obtained in the same method as shown in FIG. 4;

FIG. 17 is a view of an optical path showing further another embodiment of the pre-deflection optical system of FIG. 3;

FIG. 24 is a schematic expanded view of an optical path showing another embodiment of the laser exposing unit of FIG. 1;

DETAILED DESCRIPTION OF THE PREFERRED EMBODIMENTS

Embodiments of the present invention will be explained with reference to the drawings.

Figure 1:
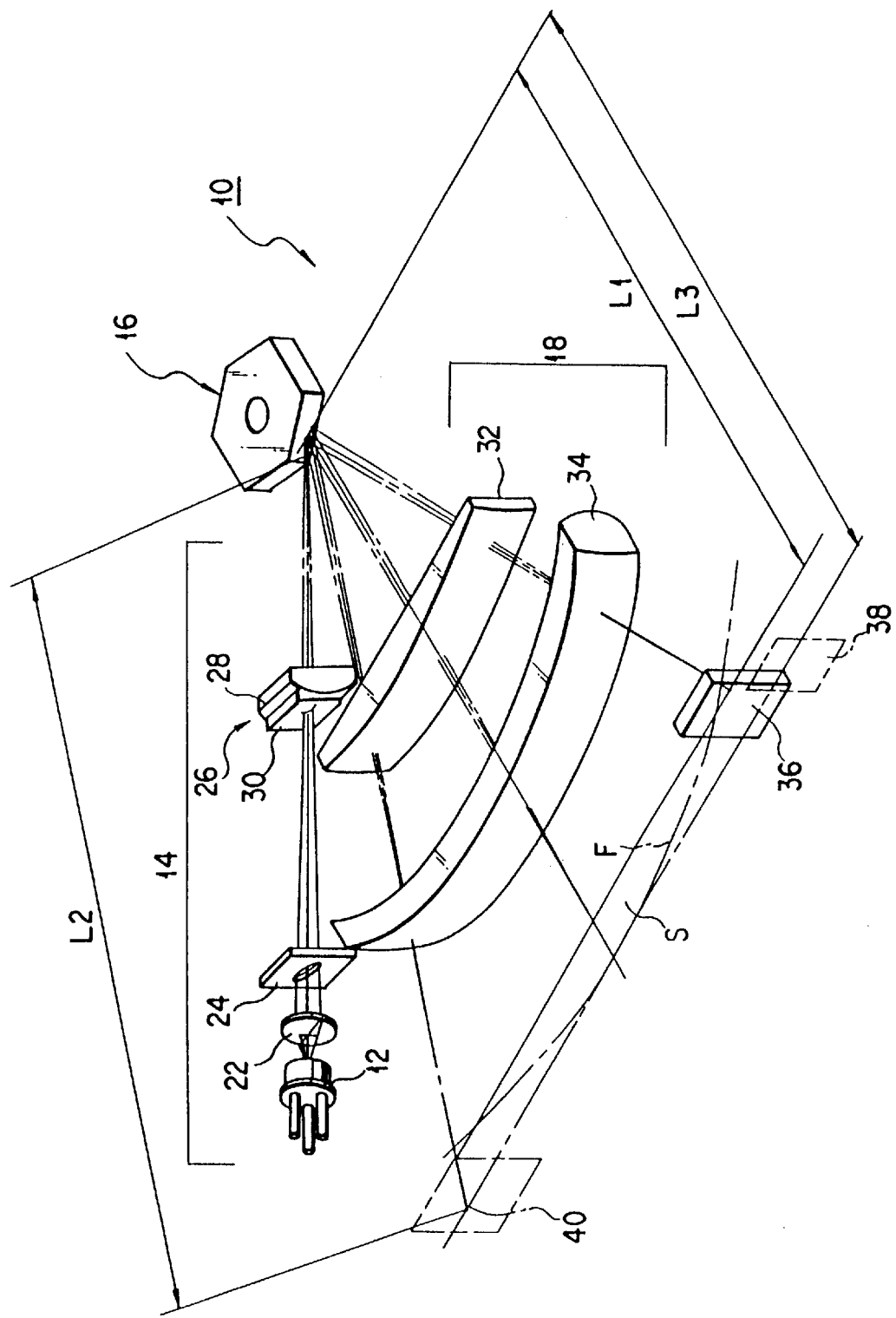
FIG. 1 is a schematic expanded view of an optical path showing one example of a laser exposing unit of an embodiment of the present invention.

FIG. 1 shows is a laser beam exposing unit of the embodiment of the present invention in an expanded state after removing a reflection mirror, a cover, and a dustproof glass.

A laser exposing unit 10 includes a semiconductor laser 12 for generating a laser beam, a pre-deflection (light source side) optical system 14, a deflecting device 16, and a post-deflection (image surface side) optical system 18. The pre-deflection optical system 14 forms the shape of the beam cross section of the laser beam emitted from the laser 12 to a predetermined size and shape. The deflecting device 16 continuously deflects the laser beam passed through the optical system 14 in a main-scanning direction, which is a first direction of an image surface S (position corresponding to a scanning surface, that is, a surface of a photo-sensitive drum 51 of an image forming device 2 to be explained later; and in FIG. 1, the position where the laser beam is image-formed is virtually shown). The optical system 18 is provided between the deflecting device 16 and an image surface S so as to image-form the laser beam deflected by the deflecting device 16 in a state to be substantially equal at any positions along the main-scanning direction of the image surface S. The image surface S is a design image surface, which is the position corresponding to the surface of the photosensitive drum to be explained later. A position where the laser beam passed through each lens is actually image-formed is shown by an image-formed surface V (shown in FIG. 10).

The pre-deflection optical system 14 has a finite lens 22, an aperture stop 24, and a cylinder lens 26. The condenser lens 22 provides a predetermined focusing property to the laser beam emitted from the laser 12 in each of the main-scanning direction and the sub-scanning direction, which is perpendicular to the main-scanning direction. The aperture stop 24 reduces influence of variation of the radiation angle of the laser beam passed through the finite lens 22. The cylinder lens 26 further provides a focusing property to the laser beam passed through the aperture stop 24 in the sub-scanning direction.

By use of the optical system 14, the beam shape of the cross section of the laser beam is reduced to be a predetermined size so as to provide recording density e.g., 600 [dpi; dots per inch].

The deflecting device 16 includes a polygonal mirror having a plurality of reflected surfaces, and a DC brushless motor, and the polygonal mirror is rotated at a predetermined speed. It is noted that the direction where the laser beam is deflected by the deflecting device 16, that is a direction parallel to the axis line of the photosensitive drum 51 is the main-scanning direction, and the direction perpendicular to the main-scanning direction is the sub-scanning direction.

The optical system 18 has first and second fθ lenses 32 and 34, which are used to image-form the laser beam, which is deflected at an effective deflecting angle of −30° to 30° by the deflecting device 16, on the image surface S with substantially a linearity and substantially an equal beam diameter. The fθ lenses 32 and 34 are also used to correct a variation of the arrival position of the laser beam due to the difference of the tilt between the individual surfaces of the polygonal mirror, that is, the tilt of the polygonal mirror.

The laser exposing unit 10 includes a horizontal synchronization detecting sensor for detecting a horizontal synchronization of the laser beam deflected by the deflecting device 16, and shielding members 38 and 40 for shielding a ghost beam (to be described later) from being arrived at an image area of the image surface S (substantially the photosensitive drum 51).

The following will explain the property of each optical element of the laser exposing unit 10.

The finite lens 22 is a finite glass lens of convex and form, and the distance from deflecting point to imaging point $L_3$ is larger than $L_1$ of FIG. 1 by 5 to 6 mm, and shorter than the distance $L_2$ (A circular arc is shown by a dotted line F wherein the distance $L_3$ is a radius)

Here, the distance $L_1$ shows the shortest distance between a reflecting point of each reflected surface of the deflecting device 16, that is, the deflecting point and the image surface S. The distance $L_3$ is from the imaging point in the main-scanning direction to the deflecting point, which can be obtained by replacing the lens surface of each of first and second fθ lenses 32 and 34 with a plane having a thickness of 7 mm with no power on an optical axis. Similarly, the distance $L_2$ shows the distance between the deflecting point and the end portion of the effective area of the image surface S.

According to the above-mentioned structure, aberration corrections in the main-scanning direction such as deformation aberration and filed curve are provided to for the post-deflection optical system including the plastic lens, which is easily influenced by the environment. Also, power in the main-scanning direction itself can be provided to the pre-deflection and environmental dependency can be small environmental dependency.

In this case, the change of the quantity of correction is substantially proportional to the temperature. Due to this, the smaller the quantity of correction is before and after correction, the smaller the influence of the plastic lens, which is easily subjected to the influence of the environmental change after deflection, in other words, in the pre-deflection optical system having a small change in the environment in the main-scanning direction.

The aperture stop 24 is provided at a rear side focal point of the finite lens 22, and is used to reduce influence of the variation of the radiation angle of the semiconductor laser 12 on the beam diameter of the laser beam image-formed on the image surface S.

The cylinder lens 26 has a glass cylinder lens 28, which has a side facing to the aperture stop 24, that is, an incidence surface side where the laser beam is incident is formed convex, and a plastic cylinder lens 30 such as PMMA (polymethacrylonitrile) adhered to the incident lens surface. The plastic cylinder lens 30 is provided in only an area where the laser beam, which is emitted from the laser 12 and passed through the aperture stop 24, is passed, that is, usable area (laser passing area). The cylinder lens 26 is used to control the change of the beam west position of the sub-scanning direction provided by the first and second fθ lenses 32 and 34 (that is, position where the laser beam becomes smallest) to optimize the beam west position of the sub-scanning direction in the laser beam directing to the photosensitive drum S after passing the first and second fθ lenses 32 and 34.

The first and second fθ lenses 32 and 34 are formed of resin material, such as PMMA whose processing cost is smaller than the case of a glass lens. A complementary optical property to be described later is provided to the first and second fθ lenses 32 and 34.

The first fθ lens 32 is formed such that the incident lens surface where the laser beam is incident and the emission lens surface where the laser beam is emitted are aspherical.

In the incident lens surface and the emission lens surface, it is assumed that an intersection of the optical axis of each lens surface and each lens surface is an origin. A distance in the direction along an optical axis is set to z. Then, a direction, which is perpendicular to the optical axis and where each lens surface is extended, that is, a distance, which is along an axis substantially parallel to the direction where the beam is deflected by the deflecting device, is set to y. In this case, the following equation can be obtained for the local coordinates systems:

$$z = gi\ (y)$$

wherein i is a number of surfaces of a corresponding lens (order).

When the shape of a generating profile (meridian) of the incident lens surface and that of the emission lens surface are shown by the above equation, each of first and second smaller (or larger) derivative surfaces is changed at at least one position other than its local coordinates' system origin. The decentering and inclination are provided to the optical axis passing the incident lens surface and the emission lens surface. Also, each optical axis is displaced to the incident beam in the same direction of the sub-scanning direction (a predetermined amount of offset is provided to a portion between the optical axes of the emission lens surface and the incident lens surface).

The second fθ lens 34 is formed such that the incident lens surface is aspheric toric and emission lens surface is aspherical.

Similar to the first fθ lens 32, if the shape of the generating profile (meridian) of the lens surface is defined by the following equation for the local coordinate systems:

$$z = gi\ (y)$$

wherein i is a number of surfaces of corresponding lens (order), the relationship between the first and second derivatives of incident and emission surfaces to y are formed to show substantially inverse properities to the first fθ lens 32. Also, similar to the case of the first fθ lens 32, the decentering and inclination are provided to the optical axes of the incident lens surface and the emission lens surface. Moreover, the optical axis passing the emission lens surface is placed to the same direction of the first fθ lens 32 of the sub-scanning direction to the incident beam, and the optical axis passing the incident lens surface is placed to the opposite direction (Table 3 to be described later show the shape and position of each lens).

A horizontal synchronization detection sensor 36 detects the arrival of the laser beam deflected by the deflecting device 16, and outputs a reference position signal to a horizontal synchronizing circuit (not shown). The horizontal synchronizing circuit generates a horizontal synchronizing signal by inputting the reference position signal therein, so that timing for writing image data is matched.

Shielding members 38 and 40 are used to prevent a ghost beam to be described later from being introduced into an area close to an image area of the image surface S (photosensitive drum 51). The ghost laser beam is formed by reflecting the laser beam, which is deflected to the image surface S by the deflecting device 16, upon the aspherical surface, that is, the emission lens surface of the second fθ lens 34, and the toric surface, that is, the incident lens surface.

FIG. 2 shows a schematic view showing the laser beam printer into which the optical device of FIG. 1 is incorporated.

An operation of a laser printer 2 of FIG. 2 will be explained as follows.

A main switch (not shown) is turned on, thereby the laser beam printer is initialized along a predetermined program, and a standby state in which an image can be formed based on image data is defined. Image data supplied from an outer unit such as a wordprocessor or a host computer is sequentially stored in an image memory 8 (not shown).

Image data inputted to the image memory 8 is converted to a parallel data at a RAM (not shown) of the memory 8, and further converted to serial data, and supplied to a laser exposing unit 10 through a controller 6.

By inputting image data, a photosensitive drum 51 is rotated at a predetermined speed by a motor (not shown), and a predetermined potential is provided by a charging device 52. Paper cassettes 61a 61b in which paper P where an image is printed and outputted based on image data are provided. The paper P contained in the selected cassette or bypass feeder is picked up by a feeding roller 62a or 62b corresponding to each cassette, and transferred to an aligning roller 67 through a transfer roller 64(63) and a paper guide 66 (65).

Image data converted to serial data is supplied to a laser exposing unit 10 in accordance with a vertical synchronizing signal sent from a vertical synchronizing controller (not shown), so that strength of the laser beam generated from the laser is continuously changed. The laser beam whose strength is continuously changed in accordance with image data is transmitted to the photosensitive drum 51, and converted to an electrostatic latent image. The image converted to the latent image on the photosensitive drum 51 is guided to a developing area opposite to a developing unit 53 along the movement of the photosensitive drum 51, developed when toner is selectively supplied to the latent image through the developing unit 53, and transferred to a transferring area opposite to a transferring device 54 when the photosensitive drum 51 is rotated.

The top end of paper P, which is temporarily stopped at the aligning roller 67, is matched with the top end of the image in accordance with a vertical synchronizing signal sent from a vertical synchronizing circuit (not shown), and paper P is supplied to the photosensitive drum 51. Therefore, paper P is adhered onto the photosensitive drum 51 at a predetermined timing by an electrical charge left on the photosensitive drum 51. Thereafter, an electrical charge having the same polarity as the electrical charge already supplied to the photosensitive drum 51 is supplied to the photosensitive drum 51 from the transfer device 64, and an toner image on the photosensitive drum 51 is transferred to paper P.

Paper P on which the toner image is mounted is guided to a fixing unit 57, toner is melted, and the toner image is fixed.

Separately from the above, the photosensitive drum 51 in which paper P and the toner image are separated is further rotated, and the distribution of the electric charge of the surface is returned to the initial state, and is used in the next image formation.

Paper P in which image data is outputted by the above-mentioned series of image forming process is discharged to the outer unit of the device 2 through a discharge roller 69. In this case, paper P is discharged to first and second discharge sections 71 and 74 by the operation of a switch gate of the controller 6. The front and back of paper P directed to the second discharge section 74 are inverted by a transfer path 72 and discharging roller 73.

FIG. 3 is a view showing an optical path of a pre-deflection optical system (optical system of the light source side) of the laser beam exposing unit of FIG. 1. In FIG. 3, a semiconductor laser 12 is virtually shown by a light emitting point 12' (Table 1 shows the shape, material, and position of the cylinder lens 26).

TABLE 1

| curvature | | | | |
|---|---|---|---|---|
| main-scanning direction | sub-scanning direction | distance | material | remarks |
| — | — | 16.542991 | air | f = 15.82 |
| plane | plane | 20.9 | air | |
| plane | .0309545 | 0.1 | PMMA | |
| plane | plane | 5 | BaSF10 | |
| | | 128 | air | |

As already explained by use of FIG. 1, the laser beam passed through the finite lens 22 is incident onto the cylinder lens 26. The cylinder lens 26 has a glass cylinder lens 28 whose incident lens surface is convex, and a plastic lens such as PMMA (polymethacrylonitrile) adhered to the incident lens surface of the glass cylinder lens 28. The surface formed to face to the incident lens surface of the plastic lens 30, that is, the aperture stop 24 is defined to be substantially plane. The cylinder lens 26 is moved in the adjustment in a direction of z (at the time of assembly).

FIG. 4 shows the change of the beam diameter at the image surface (scanning surface, that is, arrival position of the laser beam in the design in which the surface of the photosensitive drum 51 is assumed) due to the temperature change in a case that the pre-deflection optical system 14 of FIG. 3 is used. As already explained, the arrival position of the laser beam in the design to evaluate the laser exposing unit of the present invention is the image surface (point) S, and the position where the laser beam is actually formed is the image-formation surface (point) V.

According to FIG. 4, a horizontal axis shows the amount of shift from the set value of the position of the z direction of the cylinder lens 26 (that is, amount of adjustment in which the lens 26 is moved be adjusted), and a vertical axis shows a beam diameter of the sub-scanning direction at the central portion of the image surface S. The measuring (environmental) conditions are shown as follows:

More specifically, $n_d$ (solid line) shows the temperature of 30° C. and humidity of 0%, $n_H$ (broken line) shows the temperature of 50° C. and humidity of 0%, and $n_L$ (one dotted chain line) shows that temperature of 10° C. and humidity of 100%. Under these conditions, the actual refractive indexes are $n_d$=1.48325, $n_H$=1.4789, and $n_L$=1.4876.

Figure 25:
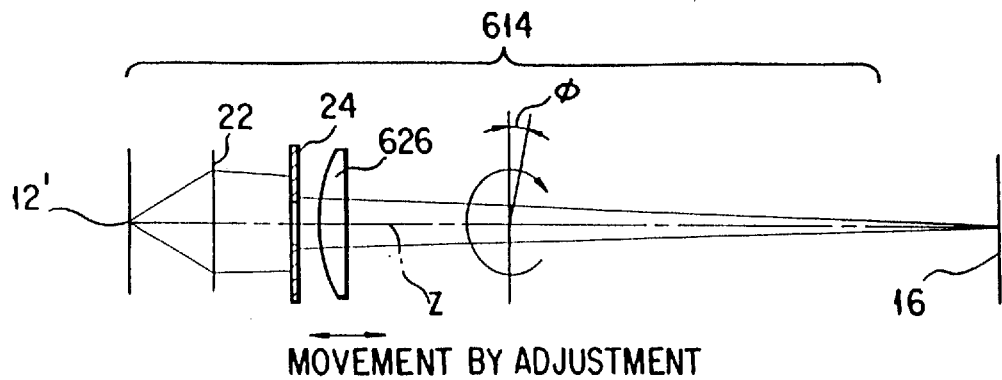
FIG. 25 a schematic view of an optical path showing the conventional pre-deflection optical system by the same method as FIG. 3.

FIG. 25 shows a schematic view of the beam of a pre-deflection optical system 614 as an example in which the optical system of the light source side (pre-deflection) of the laser beam exposing unit of FIG. 1 is provided at the conventionally used lens position. Similar to the case of FIG. 3, the laser 12 is represented by the emitting light 12'.

As is obvious from FIG. 25, the pre-deflection optical system 614 is formed of only a general cylinder lens 626. The shape, material, and position of the lens 626 is shown in the following Table 2.

TABLE 2

| curvature | | | | |
|---|---|---|---|---|
| main-scanning direction | sub-scanning direction | distance | material | remarks |
| — | — | 16.5429 | air | f = 15.82 |
| plane | .00935 | 21.2 | air | |
| plane | plane | 5 | BK7 | |
| | | 128 | air | |

Figure 26:
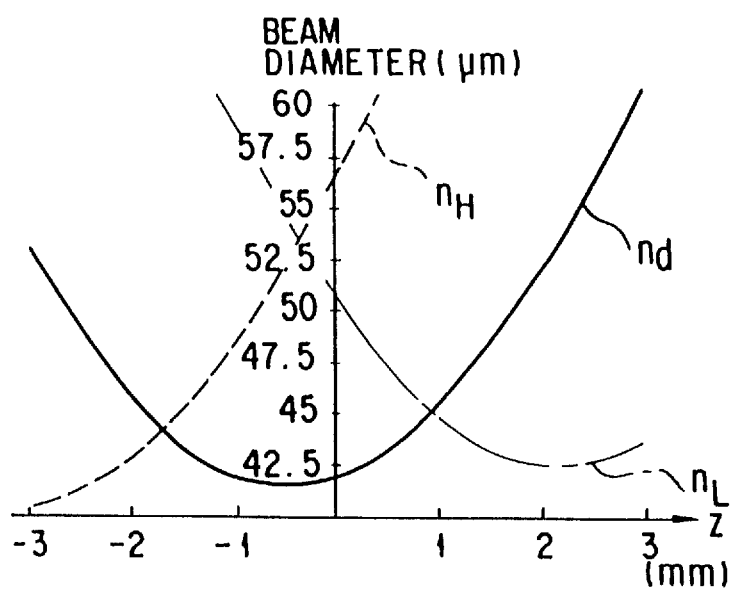
FIG. 26 is a graph showing a shift of the position of the lens and a beam diameter in the sub-scanning direction which are obtained by the same method as the method shown in FIG. 4 in connection with the conventional exposing unit of FIG. 25.

FIG. 26 shows the change of the beam diameter obtained by the same method as the case of FIG. 4, and the displacement of the arrival position of the laser beam at the logic image-formation surface. In this case, the actual refractive indexes $n_d$, $n_H$, and $n_L$ are defined at the same conditions.

The following will explain the shape and position of each of the first and second fθ lenses 32 and 34 of the post-deflection optical system 18.

Figure 5B:
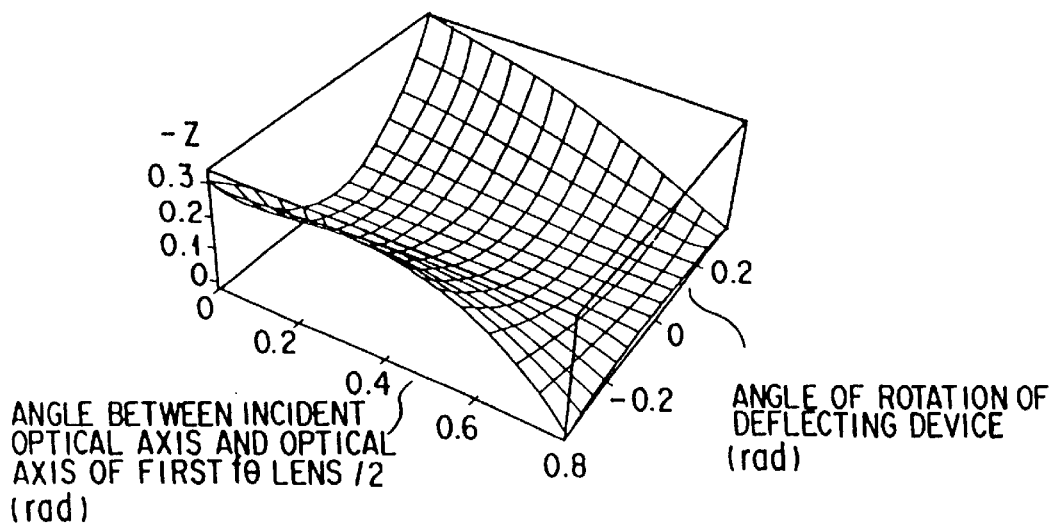

FIG. 5A shows a coordinate y to axis y' (not shown) in the scanning plane perpendicular to the advance direction of the laser beam seen from the optical axis passing the incident lens surface of the first fθ lens 32. FIG. 5B shows a coordinate z to axis z' (not shown) of the advance direction of the laser beam in the same state.

Each graph shows the state that a radius of a circle inscribing to the polygon mirror of the deflecting device 16 is normalized as "1."

According to FIGS. 5A and 5B, the vertical axis shows the coordinates y and z of the reflecting point of the main light beam in the coordinate system in which the main-scanning direction is y in a state that the rotation angle of the reflecting mirror of the deflecting device 16 is 0 [rad]. The horizontal axis shows an effective angle of the post-deflection optical system defined by the incident optical axis of the deflecting device 16 (the effective angle is ½ of the angle formed between the optical axis passing the first fθ lens 32 and the incident optical axis, and the front incident is "0." Similarly, the axis of the innermost direction shows the rotation angle [rad] of the deflecting device 16 in which a direction where the y component of the normal vector of the reflecting surface of the deflecting device 16 and the y component of the unit vector of the optical axis of the first fθ lens 32 are conformed to each other.

As is obvious from FIGS. 5A and 5B, the reflecting point of the deflecting device 16 is asymmetrical at "+" side and "−" side of the rotation angle of the reflecting surface of the deflecting device. Due to this, in a case that the laser beam to be incident onto the deflecting device 16 is a focusing beam, the curvature generated in the image-formation surface becomes asymmetrical.

It is easily understood that the post-deflection optical system 18, that is, the system wherein the optical property of the first fθ lens 32 and that of the second fθ lens 34 are synthesized must be provided at the position of the aberration component and of the form the reflecting point of the deflecting device 16. Therefore, in the incident lens surface and the emission lens surface of each of the first and second fθ lenses 32 and 34, different inclination and decentering are provided to the optical axis passing the incident lens surface of the first fθ lens 32. Also, the incident lens surface of the second fθ lens 34, that is, the generating profile (meridian) of the toric surface is formed to have no symmetrical axis (asymmetry).

Table 3 shows the optical property of the element forming the system in which the optical property of the first fθ lens 32 and that of the second fθ lens 34 are synthesized.

TABLE 3

| curvature | | | | | |
|---|---|---|---|---|---|
| main-scanning direction | sub-scanning direction | absolute coordinate original | direction | aspherical coefficient | material |
| .0023476155 | — | x = −6.215378<br>y = −1.012802<br>z = −79.14368 | a = .091093<br>b = −4.763358<br>c = 0 | cc = 0<br>d = 2.252614 $10^{-7}$<br>e = −2.86333 $10^{-10}$<br>f = 6.76608 $10^{-14}$<br>g = −3.62348 $10^{-13}$ | PMMA |
| .006877791 | — | x = −5.499732<br>y = −1.024064<br>z = −86.227566 | a = .091093<br>b = −4.262565<br>c = 0 | cc = 0<br>d = −7.2316 $10^{-7}$<br>e = −1.25972 $10^{-10}$<br>f = 3.8103 $10^{-14}$<br>g = −7.9136 $10^{-19}$ | air |
| .0038770806 | −.04118 | x = .720015<br>y = −1.415987<br>z = −118.26773 | a = .636842<br>b = .662253<br>c = −.00477 | cc = −1.803296<br>d = 6.53452 $10^{-9}$<br>e = −3.61401 $10^{-11}$<br>f = 9.38627 $10^{-15}$<br>g = −5.52143 $10^{-19}$<br>cc_ = −1.738807<br>d_ = 1.74558 $10^{-8}$<br>e_ = −4.34045 $10^{-11}$<br>f_ = 1.08844 $10^{-14}$<br>g_ = −6.54496 $10^{-19}$ | PMMA |
| −.003364228 | — | x = −2.245013<br>y = −.908873<br>z = −125.29391 | a = .619268<br>b = −.608762<br>c = −.004617 | cc = −.964007<br>d = 8.47726 $10^{-7}$<br>e = −1.3442 $10^{-10}$<br>f = 1.7264 $10^{-14}$<br>g = −6.83015 $10^{-19}$ | air |
| plane | plane | x = 1.797699<br>y = .043905<br>z = −209.99696 | a = .600441<br>b = .500773<br>c = −.004452 | | |

The shape of the generating profile (meridian) of the system in which the optical property of the first fθ lens 32 and that of the second fθ lens 34 are synthesized can be expressed by the following equation (1).

$$Z = \frac{cy^2}{1 + \sqrt{1 - C^2(cc+1)y^2}} + dy^4 + ey^6 + fy^8 + gy^{10} \quad (1)$$

wherein c: curvature, cc: conic coefficient, d: aspherical coefficient, e: aspherical coefficient, f: aspherical coefficient, and g: aspherical coefficient.

In Table 3, the plane in which the curvature of the sub-scanning direction is "−" shows that the shape of the corresponding lens surface is rotated to the optical axis. The plane showing the curvature shows that the shape of the corresponding lens is rotated around the axis parallel to the axis of y in the plane z–y separated in a direction of the axis of z of the local coordinates of the plane by the inverse number of the curvature.

Here, the direction where the laser beam advances is from "+" of the axis of z to "−." Also, the origin of the absolute coordinates is the deflecting point (reflecting point) of the main light of the deflecting device 16 when the rotation angle of the reflecting surface of the deflecting device 16 is 0°. That is, there is shown a local coordinate origin of each lens surface at the absolute coordinate system in which the direction of -z is the direction of the reflected main light and the direction of y is the main-scanning direction. The direction of the optical axis shows the angle, which is formed by the absolute coordinate axis and the axis of the local coordinate system of each plane other than the absolute coordinate axis. The expression of "−" of the cc-, d-, e-, f-, and g- of the toric surface of the second fθ lens 34 shows the coefficient in the case that the coordinate of y of the local coordinates is minus, and the generating profile (meridian) of the toric surface has no symmetrical axis.

Here, it is needed that z, first and second differential coefficients be equal to each other at the position of the coordinate of y changing the coefficient. In the example shown in FIG. 3, although the aspherical coefficient is changed in a condition that y=0 as a boundary, the following equations can be obtained.

$|Z|_{y=0} = 0$ $|\partial z/\partial y|_{y=0} = |dz/dy|_{y=0} = 0$ $|\partial^2 z/\partial y^2|_{y=0} = |d^2z/dy^2|_{y=0} = C$ Therefore, in order to continuously form the first derivative "$|dz/dy|_{y=0}$", and the second derivative "$|d^2z/dy^2|_{y=0}$", only curvature c may be used in common as the generating profile (meridian) of the toric surface. As lens data, in the coordinate y, a set of data is formed of the conic coefficient cc of the toric surface of the toric surface of both plus side and minus side, and cc-, and aspherical coefficients of each plane, d, e, f, g, d-, e-, f-, and g-.

Separately from the above, as is obvious from Table 3, the inclination and decentering are provided to each lens surface in the direction of the axis of x.

Here, the linearity of the beam position of the axial direction of x on the image surface can be ensured by the laser beam, which is passed y=0, is passed the portion near the optical axis at the toric surface.

In the case that the plastic lens is used, since a difference between the coating material and plastic in a thermal expansion coefficient due to the temperature is increased, there has been known that an anti-reflection coating is difficult to be performed. Also, in the case that the lens surface is axisymmetically formed, it has been known that the coarse of the surface is increased in the vicinity of the axis and a projection is generated at a central portion by influence of a cutting speed of a lathe for manufacturing a mold.

Due to this, in many laser exposing units, there is used a technique in which all of lens optical axes of the post-deflection optical system is tilted or the central position is displaced. However, in any examples, it has been known that the image-formation is deteriorated as the beam diameter at the image surface becomes smaller.

Table 4 shows an area of a direction of x where the light beam passes in a state that the coordinate of y passes "0" in a case that the optical axis passing each lens is an origin.

TABLE 4

| surface | | position of beam pass through | |
|---|---|---|---|
| | | min | max |
| first fθ lens 32 | incident | 5.0 | 7.1 |
| | emission | 4.0 | 6.2 |
| second fθ lens 34 | incident | −2.3 | .6 |
| | emission | .8 | 3.5 |

As is obvious from Table 4, in the laser exposing unit 10, it is structured such that the laser beam passes the optical axis in the sub-scanning direction regarding only the toric surface of the second fθ lens 34. In other words, as already explained, the decentering and inclination are provided to the optical axes of each of the incident lens surface of the second fθ lens 34 and the emission lens surface. The optical axis of the emission lens surface is displaced in the same direction as the first fθ lens 32 of the sub-scanning direction to the incident beam. The optical axis of the incident lens surface is displaced in the opposite direction. Thereby, the deterioration of the property of the image-formation, which is recognized in the many laser exposing units, can be reduced.

Table 4 shows the passing position x of the laser beam to the optical axis when the optical axis passing the aspherical surface is shifted in the same direction. For example, in a case that the passing position x of the laser beam of the emission lens surface of the second fθ lens 34 is changed from "−3.51" to "−0.8", the shift to the linearity in the direction of x is worsened to the 0.15 p-p (peak-peak) from 0.03 p-p, which is obtained when the emission lens surface is shifted to the same direction. Therefore, the decentering and the inclination are provided to the toric surface, and the the generating profile (meridian) is preferably formed to be asymmetrical in all areas of the lens surface.

FIGS. 6A to 6E and FIGS. 7A to 7E show a first derivative, a second derivative, a third derivative, and a maximum allowable value of the third derivative relating to the shape of the incident lens surface and the emission lens surface of the first and second fθ lenses 32 and 34 and the shape of each lens surface, respectively. The first derivative shows power for changing the direction of the main light beam, the second derivative shows lens power of the local portion of the lens, and the third derivative shows the quantity, which is proportional to the quantity of change of power in a case that the lens surface is moved from the designed position. The maximum allowable value of the third derivative shows the third derivative in which the variation of the beam diameter at the image surface S is 10% in a case that tolerance of quantity of decentering is 50 μm.

Figure 6A:
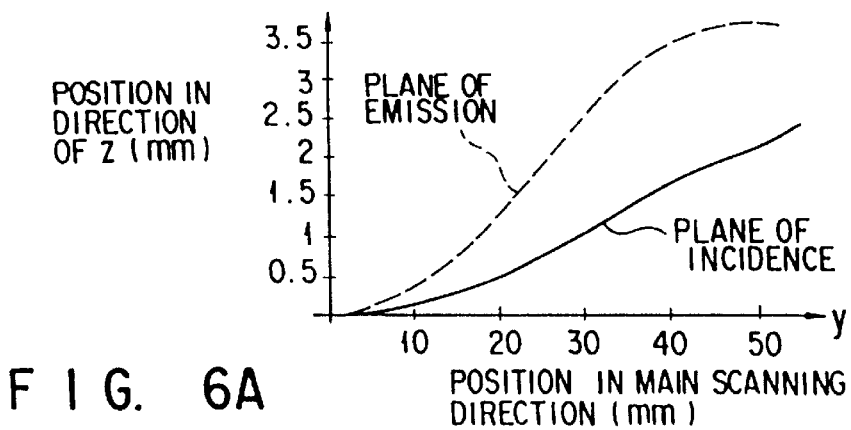
FIGS. 6A to 6E show graphs each showing a shape of a lens surface of a first fθ lens, a first derivative of the lens surface, a second derivative of the lens surface, a third derivative of the lens surface, and an allowable value of the third derivative.
Figure 7A:
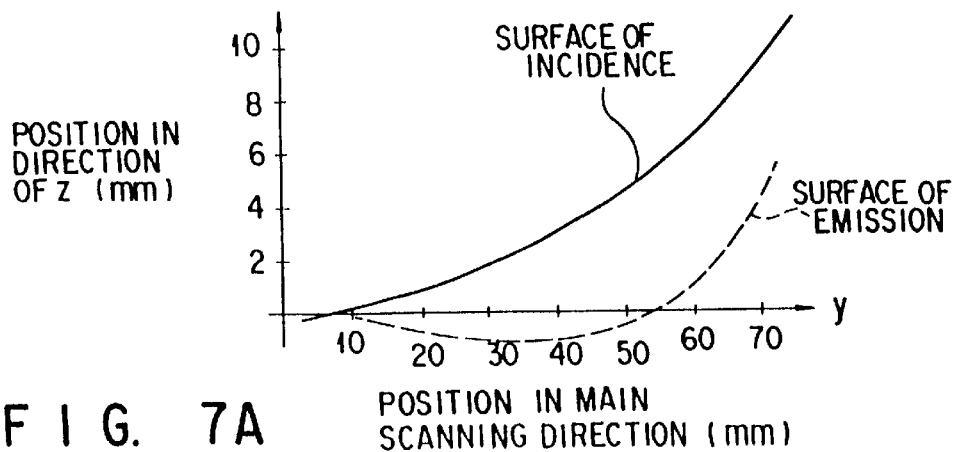
FIGS. 7A to 7E show graphs each showing a shape of a lens surface of a second fθ lens, a first derivative of the lens surface, a second derivative of the lens surface, a third derivative of the lens surface, and an allowable value of the third derivative.

FIG. 6A and FIG. 7A, the relationship between the position y of the main-scanning direction of the incident lens surfaces of the first and second fθ lenses 32 and 34 and the emission lens surfaces and the position z (thickness) of the direction where the laser beam advances are shown. In other words, the value of z to the change of y in the local coordinate system is shown. The position y is different from the position y at the image surface. That is, the crossing point of the optical axis of each of the fθ lenses 32 and 34 and the lens surface is used as an origin, the direction of the optical axis is z, and the main-scanning direction is y.

Figure 6B:
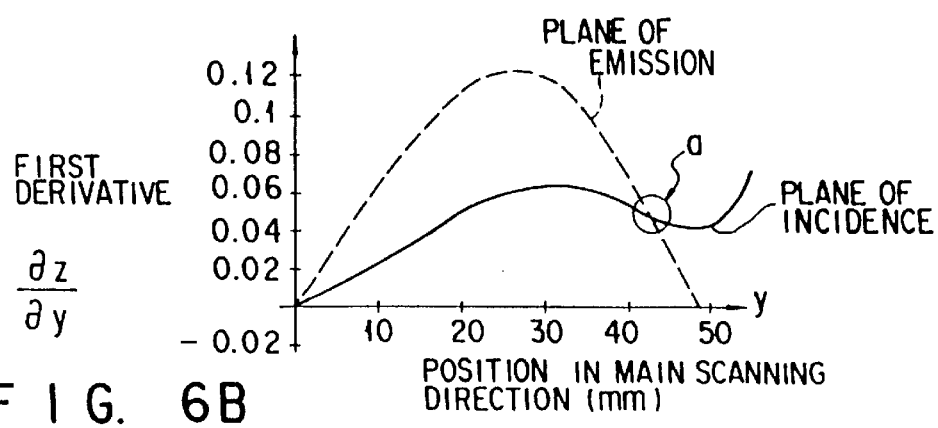
Figure 6C:
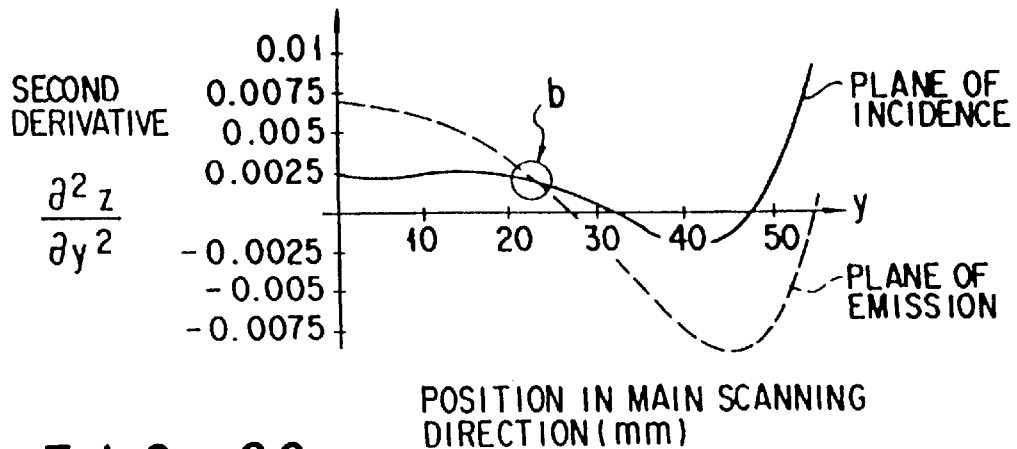

According to FIGS. 6B and 6C, in the first and second derivative of the incident lens surface and the emission lens surface of the first fθ lens 32, the position other than the position where the optical axis of the main-scanning direction and the lens surface are crossed, that is, the size is inverted at a predetermined distance between a and b from the crossing point of the optical axis and the other area.

Figure 7B:
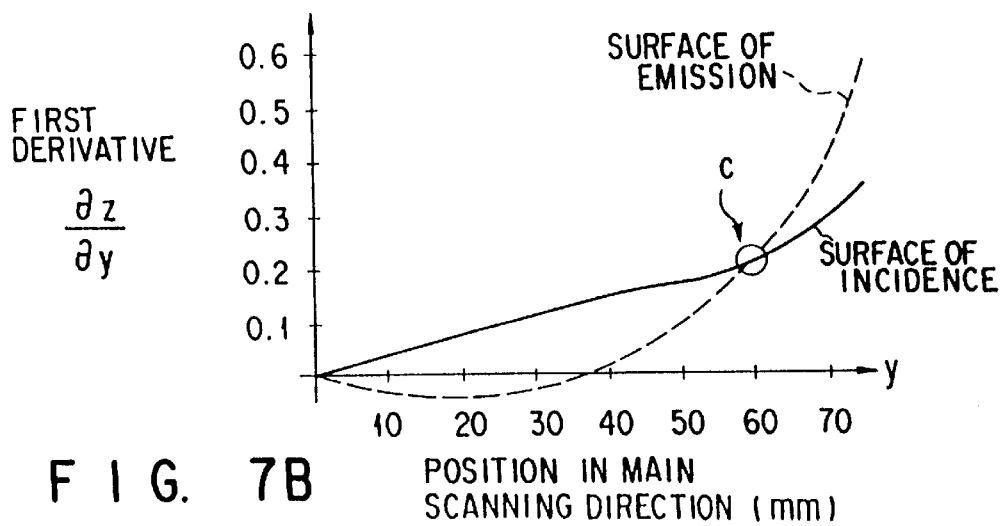
Figure 7C:
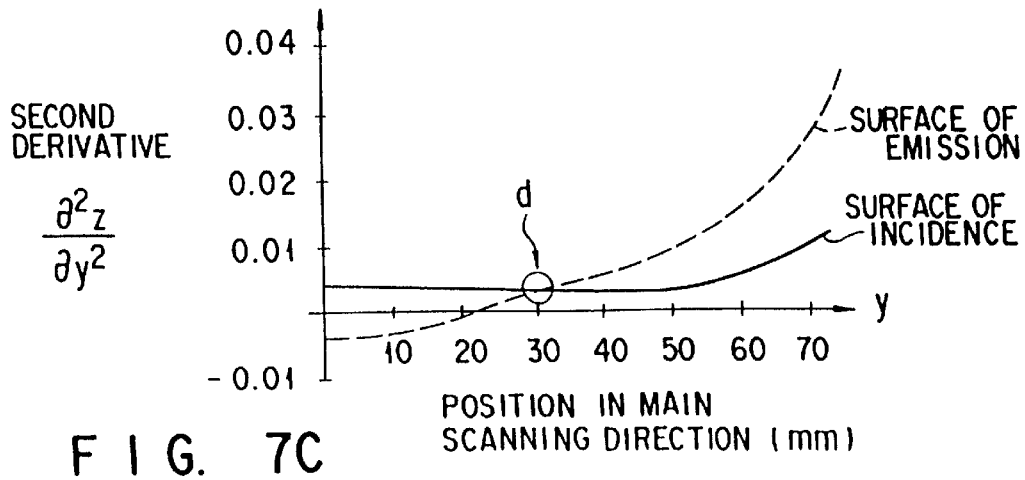

According to FIGS. 7B and 7C, similar to the first fθ lens 32, in the first and second derivatives of the incident lens surface and the emission lens surface of the second fθ lens 34, the position other than the position where the optical axis of the main-scanning direction and the lens surface are crossed, that is, the size is inverted at a predetermined distance between c and d from the crossing point of the optical axis and the other area. The first and second derivatives of each surface of the first fθ lens 32 and the first and second derivatives of each plane of the second fθ lens 34 are defined to be in substantially opposite relation to the value of y corresponding to each position where the same light beam is passed.

In other words, in the first fθ lens 32, the first and second derivatives of the emission lens surface are respectively increased to be larger than the first and second derivatives of the incident lens surface at the position close to the center of the optical axis. On the other hand, the first and second derivatives of the incident lens surface are respectively increased to be larger than the first and second derivatives of the emission lens surface at the peripheral portion. In the second fθ lens 34, the first and second derivatives of the incident lens surface are respectively increased to be larger than the first and second derivatives of the emission lens surface at the position close to the center of the optical axis. On the other hand, the first and second derivatives of the emission lens surface are respectively increased to be larger than the first and second derivatives of the incident lens surface at the peripheral portion.

The following will explain the reason the first and second derivatives of the first and second fθ lenses 32 and 34 are defined to have the opposite relationship. In this case, the first derivative is used to optimize the fθ property as described later. Also, the second derivative is used to optimize the filed curve as described later.

Figure 8A:
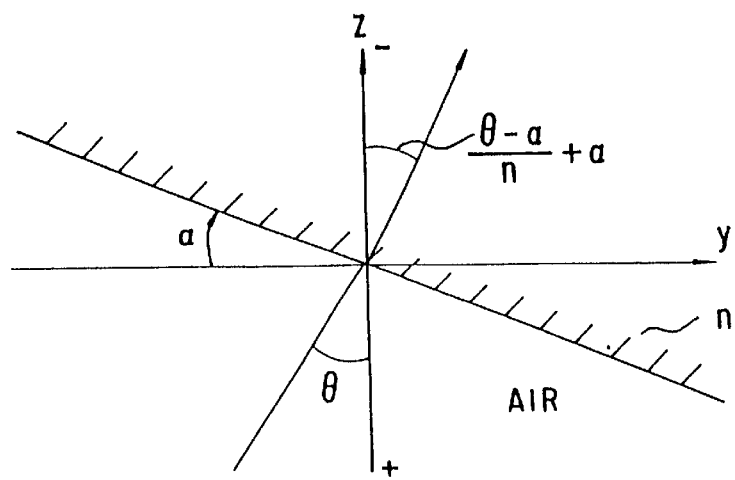
FIGS. 8A and 8B are schematic views of an optical path showing a relationship between the first derivative of the lens surface and the laser beam passed through the lens.

According to FIG. 8A, light, which is incident upon a layer having a refractive index n and an inclination angle α from an air layer, is approximated to sin θ=θ and sin α=α, thereby light is emitted at (θ−α)/n+α.

Figure 8B:
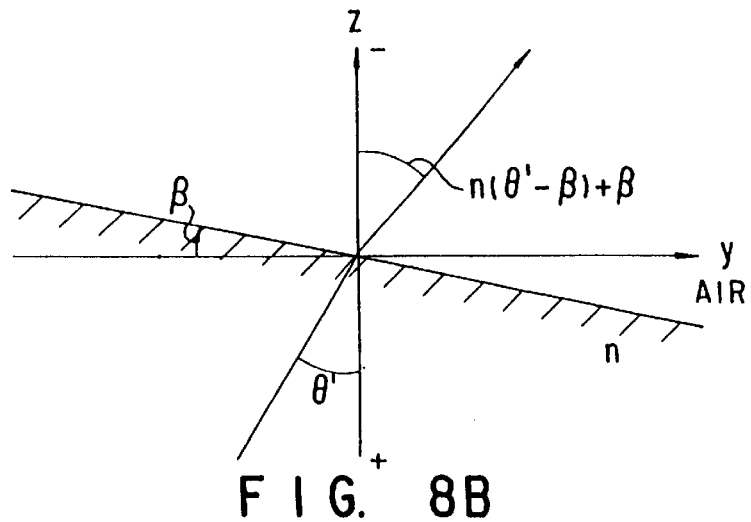

On the other hand, as is obvious from FIG. 8B, light, which is incident upon an air layer having an inclination angle β from a layer having a refractive index n, is emitted at (θ'−β)+β by the similar approximation. In other words, the laser beam, which is incident upon the layer having refractive index n and inclination angle α at an incident angle θ, is emitted at an angle of θ+ (n−1)×(α−β). In FIGS. 8A and 8B, α and β show an inclination from the axis of y, and have a value of "−" to the direction of z, respectively.

When the inclination angle α is low, the inclination angles α and β are replaced with the first derivative since tan α can be approximated to α. Due to this, the angle of the laser beam, which is passed through the layer having the refractive index n and the inclination angle α from the air layer and further passed through the air layer having the inclination angle β from the air layer, is increased by (n−1)×(α−β).

In this case, as the value of $(n-1) \times (\alpha - \beta)$ becomes higher, the value of f is increased in connection with the fθ property. Due to this, in a case that $(n-1)$ is changed, the function of increasing the value of f is substantially proportional to $(\alpha - \beta)$. In a case that $\alpha - \beta < 0$, it is functioned to reduce the value of f.

Therefore, $(\alpha - \beta)$ of each lens is made apochromatic at the position where the laser beam, which is passed through the the first fθ lens 32 and the second fθ lens 34, is passed at substantially the same deflection angle, the influence onto the fθ property due to the change of the refractive index can be canceled.

In this way, it is useful to replace the degree of the first derivative at the position other than the crossing point of the optical axis and the lens surface in order to increase the value f of the fθ property. Increase in the value f of the fθ property shows that the scanning area on the main-scanning surface can be largely obtained even if the deflecting angle of the laser beam deflected by the deflecting device 16 is small.

Due to this, the distance between the deflecting device 16 and the image-formation surface v can be reduced, and the size of the laser exposing unit can be reduced.

On the other hand, the second derivative can be explained by use of the equation of thin lens:

$$-1/f = (n-1) \times (c_1 - c_2)$$

wherein f: focal distance obtained by synthesizing both of the focal distance of the incident and emission surfaces of the lens 32 and both of the focal distance of the incident and emission surfaces of 34, $c_1$: curvature of incident lens surface, $c_2$: curvature of emission lens surface, "−" of left side shows that laser beam advances from z direction "+" to "−." Since the curvature can be replaced with the second derivative "$|d^2x/dy^2|_{y=0} = C$", $C_1$ and $C_2$ can be rewritten to the second derivative of the incident lens surface and the emission lens surface, respectively.

Therefore, it is recognized that the image forming point can be moved to the side of the deflecting device 16 as the value of $(n-1) \times (c_1 - c_2)$. At this time, the function of moving the image forming point to the deflecting device 16 due to the change of $(n-1)$ is substantially proportional to $(c_1 - c_2)$.

Therefore, when $c_1 - c_2 > 0$, the image forming surface V is moved to the direction opposite to the deflecting device 16. Also, when $c_1 - c_2 < 0$, the image formation surface V is moved to the deflecting device 16.

In this way, in connection with the laser beam, which is passed through the first and second fθ lenses 32 and 34, $(c_1 - c_2)$ of each lens is inversely coded at the position where the laser beam, which is passed through the the first fθ lens 32 and the second fθ lens 34, is passed at substantially the same deflection angle, the influence (influence onto defocus) onto the image forming surface V due to the change of the refractive index can be canceled.

Also, the point that the surface of the larger second derivative is replaced at the position separated from the optical axis by a predetermined distance shows that the thickness of the lens can be thinned. Since this explains that the change of thickness of the lens can be reduced, forming time, which is necessary to form and process the first and second fθ lenses, can be shortened. As the same time, accuracy of processing can be improved.

The point that the aspherical surface and the asymmetrical toric surface are provided to the incident plane and the emission plane of the first and second fθ lenses 32 and 34 is as explained above. Also, the point that high accuracy of the position in the case that the lens is fixed, high accuracy of processing as a unit of the incident plane and that of the the emission plane, and high accuracy of the displacement of the position of the incident plane and that of the emission plane are required is as explained above.

In a case that the position of any of the lens surfaces is largely displaced from the designed value, it has been known that the beam diameter or rms opd (root mean square optical path difference, root mean square of the optical path difference) is largely varied.

In a case that the beam diameter is varied, the size of the picture element is changed, and density of image is changed in an intermediate tone image. Due to this, particularly, in the laser beam printer, it is experimentally confirmed that variation of the beam diameter must be controlled to substantially ±10%.

Since rms opd is changed at a predetermined rate in accordance with the quantity of accumulation of the assembly tolerance, rms opd is used to evaluate the accuracy of assembly. Also, the change rate to the change of rms opd can be obtained by $\{\partial \text{rms opd}\}/\partial \phi$ wherein λ: wavelength, φ: quantity of which cylinder lens 626 is rotated around the optical axis (assembly error, that is, rotation angle). In this case, the rotation angle φ is preferably set to be within the range satisfying rms opd $\leq 0.07\lambda$.

It is assumed that the beam is a gaussian beam (this is so since the distribution of energy of the beam cross section is generally a Gaussian distribution). A case that the variation of the beam diameter is 10% or less will be reviewed as follows:

In a case that a radius of beam west is $\omega_0$, the wavelength is λ, and $k = 2\pi/\lambda$, a propagation expression of the gaussian beam can be shown by the following equation:

$$\omega = \omega_0 \sqrt{1 + \left(\frac{2dz}{k\omega_0^2}\right)^2} \quad (2)$$

Therefore, the quantity of defocus dz wherein a ratio of the beam diameter is $\omega/\omega_0$ can be expressed by the following equation:

$$dz = \frac{k\omega_0^2 \sqrt{\left(\frac{\omega}{\omega_0}\right)^2 - 1}}{2} \quad (3)$$

The quantity of shift dz of the image forming surface V dz in a case that the local curvature of the position where the light beam passes on both of incident and emission surfaces of the lens surface of each of the lenses 32 and 34 is shifted from c to c+d can be obtained by the following equation:

$$dz = \frac{(n-1) \ (f_2 Z_2 + f_2 Z_3 - Z_2 Z_3)^2 dc}{f_2^2} \quad (4)$$

The value of equation (4), which is smaller than the quantity in which the beam diameter becomes 1.1 times in equation (3) can be obtained from the following equation (5) under conditions that Δ: tolerance of decentering or tolerance obtained by converting inclination tolerance to corresponding decentering tolerance, n: refractive index of lens material, $f_2$: focal distance of the synthesized lenses after object lens, $z_2$: distance between the object lens and the main plane of the incident plane of the synthesized lenses after object lens, and $z_3$: distance between the main plane of the emission plane of the synthesized lenses after object lens and the logic image forming surface:

$$\left|\frac{dc}{dy}\right| < \left|\frac{k\omega_0^2 - \sqrt{1.1^2 - 1}}{z} \cdot \frac{f_2^2}{(n-1)(f_2Z_2 + f_2Z_3 - Z_2Z_3)^2} \cdot \frac{1}{\Delta}\right| \quad (5)$$

Figure 6D:
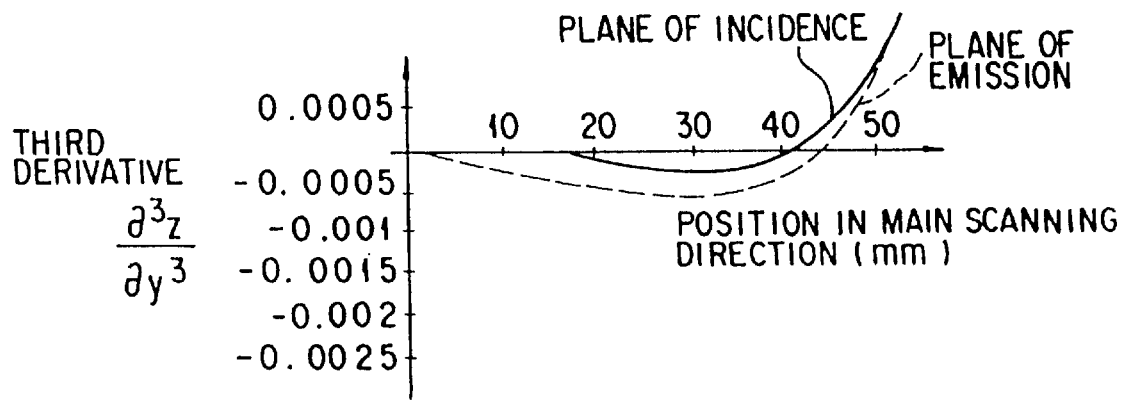
Figure 6E:
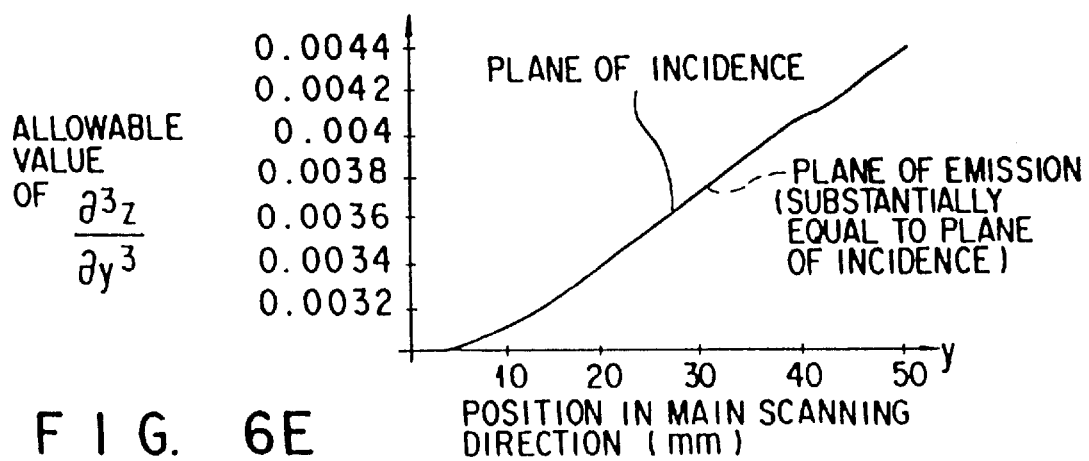
Figure 7D:
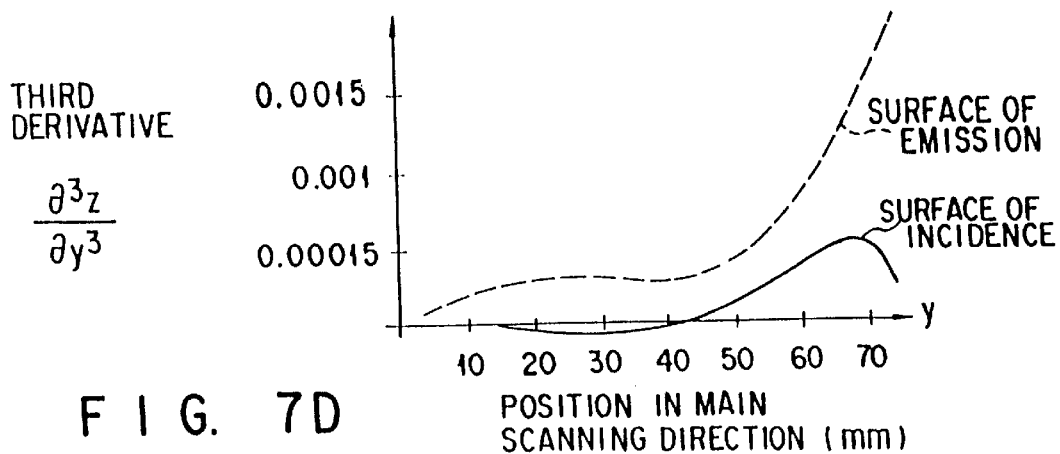
Figure 7E:
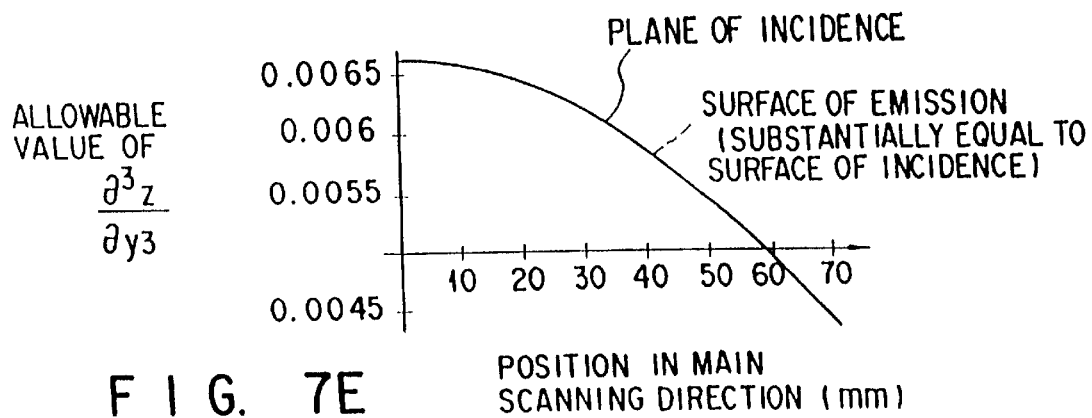

In FIGS. 6E and 7E, the allowable values of the third derivatives obtained by substituting $\Delta=0.05$ and $\omega_0=0.025$ into the equation (5) are shown. In other words, in a case that the absolute value of the third derivative of each lens shown in FIGS. 6D and 7D is below the allowable value of the third derivative shown in FIGS. 6E and 7E at the same direction of the main-scanning direction, it is shown that the variation of the beam diameter is substantially ±10% or less.

FIGS. 9 to 13 show the shift of the image forming surface position of the main-scanning direction obtained by combining the pre-deflection optical system of Table 1 and the post-deflection optical system of Table 3, fθ characteristic in a state that the refractive index is changed by the change of the temperature and that of humidity, and linearity of the sub-scanning direction. The environment conditions of each graph are that $n_d$ (solid line) shows temperature of 30° C. and humidity of 0%, $n_H$ (broken line) shows temperature of 50° C. and humidity of 0%, and $n_L$ (one dotted chain line) shows temperature of 10° C. and humidity of 100%.

Figure 9:
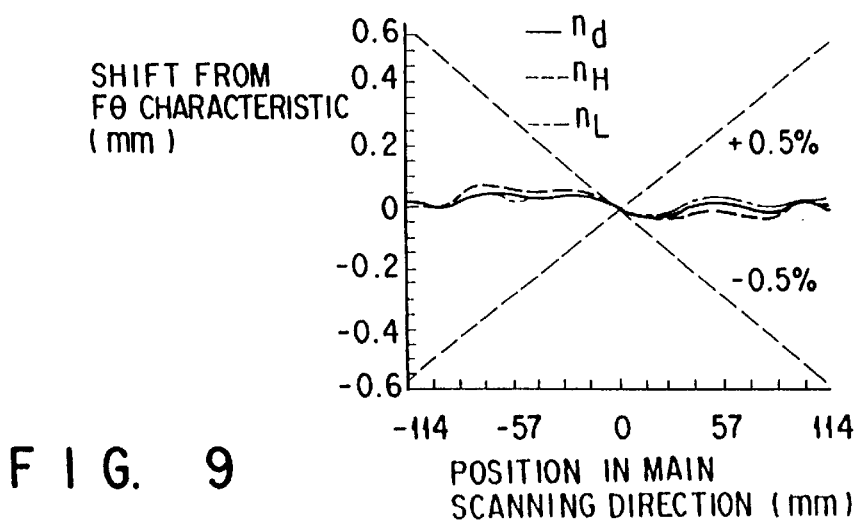
FIG. 9 is a graph showing a fθ characteristic of the laser exposing unit of the present invention, which can be obtained by combining a pre-deflection optical system shown in Table 1 with a post-deflection optical system shown in Table 3.
Figure 10:
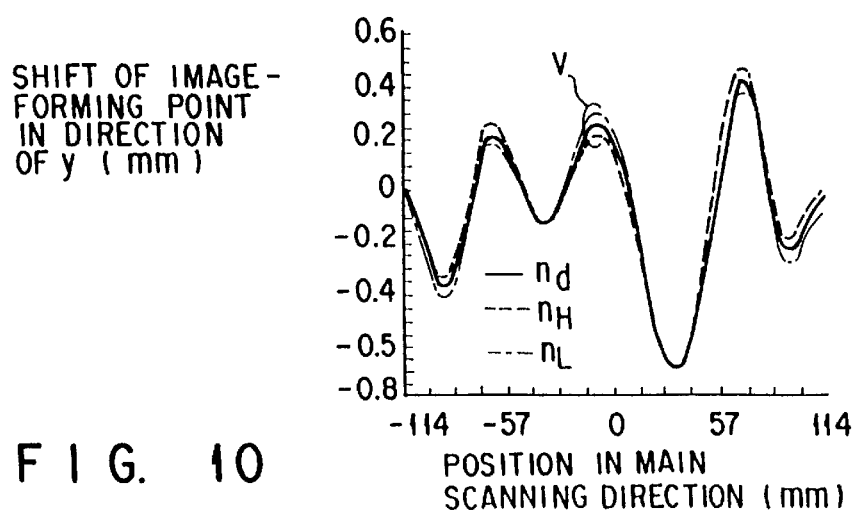
FIG. 10 is a graph showing a shift of a position of an image formation in a direction y, which can be obtained by combining a pre-deflection optical system shown in Table 1 with a post-deflection optical system shown in Table 3.
Figure 11:
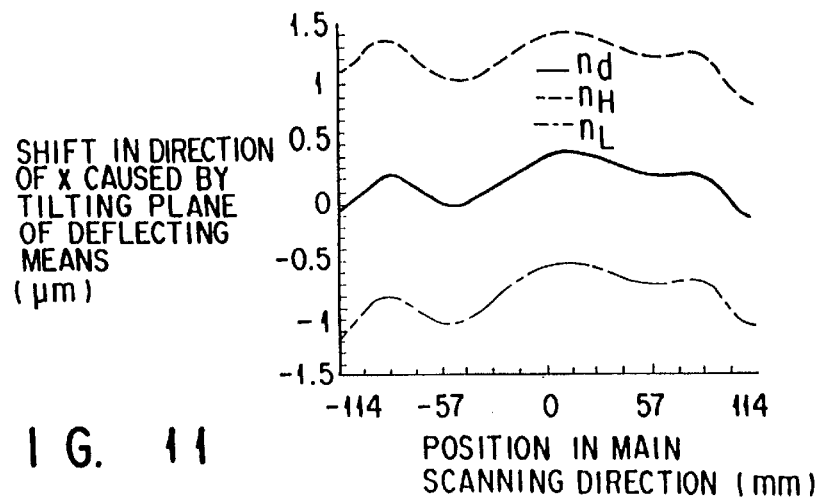
FIG. 11 is a graph showing a shift of a position of an image formation in a direction x caused by tilting a plane of a deflecting means when combining a pre-deflection optical system shown in Table 1 with a post-deflection optical system shown in Table 3.
Figure 12:
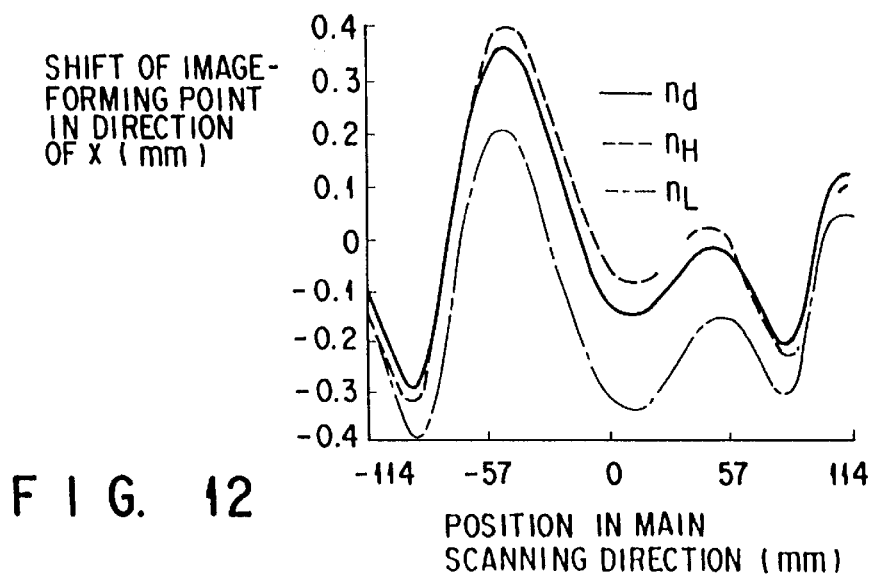
FIG. 12 is a graph showing a shift of a position of an image formation in a direction x, which can be obtained by combining a pre-deflection optical system shown in Table 1 with a post-deflection optical system shown in Table 3.
Figure 13:
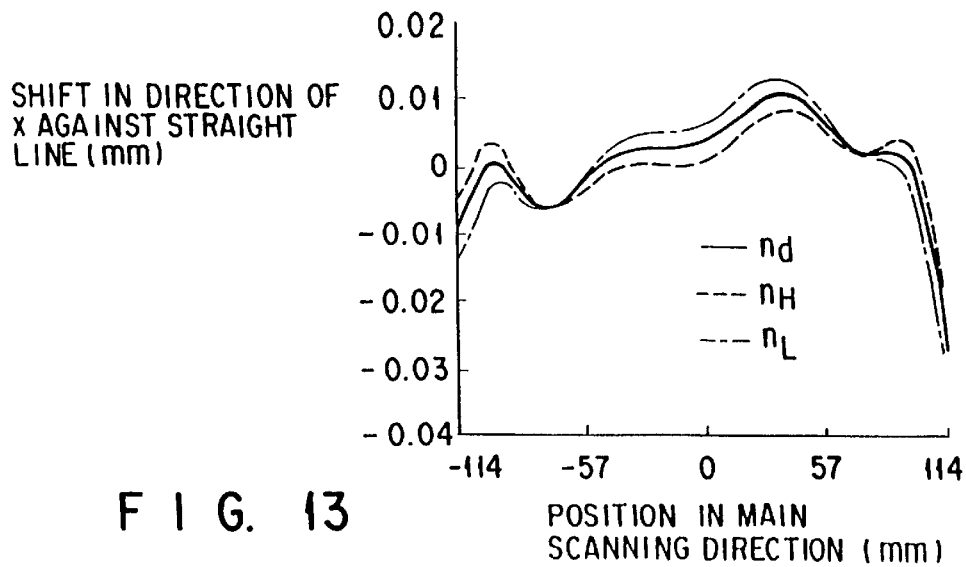
FIG. 13 is a graph showing a shift of a position of an image formation in a direction x to a straight line of the laser beam emitted from the laser exposing unit of the present invention, which can be obtained by combining a pre-deflection optical system shown in Table 1 with a post-deflection optical system shown in Table 3.

FIG. 9 shows the change of fθ characteristic, FIG. 10 shows the change of the image forming position of the main-scanning direction, and FIG. 11 shows the change of the image forming position in the direction of the axis of x due to tilting of the surface of the deflecting device 16. Also, FIG. 12 shows the value of defocus of the direction of axis of x, that is, filed curve, and FIG. 13 shows the shift of the direction of the axis x to a linear line of the sub-scanning direction.

As shown in FIGS. 9 to 13, even in a case that the plastic lens is used in both the first and second fθ lenses 32 and 34, each fθ lens is formed to have the property shown in FIGS. 6A to 6D and FIGS. 7A to 7D, thereby substantially canceling the influence, which is caused when the refractive index is changed by the change of the temperature or that of the humidity.

FIGS. 14A to 14D show the shape of an opening of the aperture stop to be incorporated into the pre-deflection optical system 14 of the optical system of FIG. 1.

The opening shown in FIG. 14A is formed to be an ellipse containing the crossing point of the diagonal axis of the main-scanning direction and that of the sub-scanning direction. The long diameter of the ellipse is conformed to the main-scanning direction.

More specifically, the ellipse can be shown by the following equation:

$$(X^2/a^2)+(Y^2/b^2)=1$$

wherein the main-scanning direction, that is, the long diameter of the direction of X axis is $2a$, and the sub-scanning direction, that is, the short diameter of the direction of Y axis is $2b$.

The shape of the opening shown in FIG. 14B is a "rectangle" circumscribing to the ellipse shown in FIG. 14A. Also, the shape of the opening shown in FIG. 14C is a "rhombus" inscribing to the ellipse shown in FIG. 14A.

If the the state of laser beam passed through the opening of FIG. 14B is evaluated based on the opening of the ellipse of FIG. 14A, it is recognized that the beam diameter is reduced in both the main-scanning direction and the sub-scanning direction. In contrast, the beam diameter of the laser beam passed through the opening of the FIG. 14C is increased in both the main-scanning direction and the sub-scanning direction. At this time, since the radius of the inscribed circle of the polygon mirror 30 of the deflecting device 16 is proportional to the beam diameter of the main-scanning direction of the laser beam of the polygon mirror 30, which is incident upon the polygon mirror 30, the beam diameter of the main-scanning direction is preferably small. On the other hand, in a case that the shape of the opening is the ellipse, the beam diameter of the main-scanning direction of the polygon mirror 30 is made small, thereby the beam diameter of the main-scanning direction onto the image surface S is increased.

In contrast, if the beam diameter of the sub-scanning direction on an emission surface of the aperture stop is made small by using the aperture stop, the distance between the cylinder lens and the deflecting plane of the deflecting device 16 can be reduced. Due to this, there is used a method in which the beam diameter is made small at the image forming point in a state that the aperture stop 24 is removed and the beam diameter is increased at the image surface S by the aperture stop 24. In this case, if a ratio of the reduced radius to the reduced beam diameter exceeds a predetermined value, there occurs a problem that side lobe is drastically increased.

In view of the above results, the shape of the opening shown in FIG. 14B is preferably a "rectangle" in the main-scanning direction, and the shape of the opening in FIG. 14C is preferably a "rhombus."

As a result, if the suitable shape of the opening is simulated, a hexagon is guided as shown in FIG. 14D.

The opening of FIG. 14D is the hexagon having an area positioned at the outside in an area nearby to a symmetrical axis of the main-scanning direction of the ellipse shown in FIG. 14 in the main-scanning direction and oblique areas positioned at the inside in an area nearby to a symmetrical axis of the sub-scanning direction of the ellipse in the sub-scanning direction.

The shape of the above opening is a polygon, which is conformed to the long diameter on the axis of the main-scanning direction, includes the outside area of the ellipse in the vicinity of the axis of the main-scanning direction, is conformed to the short diameter of 2b×1.1 (shown by one dotted chain line) on the axis of the sub-scanning line, and which includes the inside area of the ellipse in the vicinity of the axis of the sub-scanning direction, for example, the hexagon or the shape similar thereto. For conforming the main-scanning direction to the long diameter, the short diameter, that is, height in the sub-scanning direction is preferably short diameter (2b/2)2=b/2=$L_1$ at both sides of the main-scanning direction, and b×1.1=$L_2$ at the central portion. Moreover, if the shape of the opening is the shape, which includes the outside area of the ellipse in the vicinity of the axis of the main-scanning direction and the inside area of the ellipse in the vicinity of the axis of the sub-scanning direction, various shapes (not shown) can be used.

FIG. 15 shows another embodiment of the pre-deflection optical system of FIG. 3. In FIG. 15, the reference numerals are added to the same members as FIG. 3, and the specific explanation will be omitted. Table 5 shows the shape, material, and position of cylinder lens 126. Similar to FIG. 3, the laser 12 is represented by light emitting point 12'.

TABLE 5

| curvature | | | | |
|---|---|---|---|---|
| main-scanning direction | sub-scanning direction | distance | material | remarks |
| — | — | 16.5429 | air | f = 15.82 |
| plane | .02815 | 3.3 | air | |
| plane | plane | 5 | BK7 | |

TABLE 5-continued

| curvature | | | | |
|---|---|---|---|---|
| main-scanning direction | sub-scanning direction | distance | material | remarks |
| plane | .028197 | 6 | air | |
| plane | plane | 5 | PMMA | |
| | | 136.6 | air | |

According to FIG. 15, a pre-deflection optical system 114 includes a finite lens 22, an aperture stop 24, and a cylinder lens 126, which are provided in order from the side close to a light source 12'.

In the cylinder lens 126, for example, a first cylinder lens 128 formed of optical glass such as BK 7, a second cylinder lens 130 formed of PMMA are fixed to a housing (not shown) such that only the cylinder lens 128 can be independently adjusted. Also, the deflecting device 16 is fixed to the same housing as the cylinder lens 126. Moreover, in one of the first and second lenses 128 and 130 or both lenses, there is provided an adjusting mechanism in which the amount of rotation around the optical axis is controlled. However, in any cylinder lenses, in a case that the amount of rotation φ around the optical axis exceeds a predetermined value, that is, the rotation angle exceeds 1°, the above-explained rms opd is deteriorated. Due to this, high accuracy of assembly and that of the lens surface processing are required.

FIG. 16 shows the change of the beam diameter, which is obtained by the same method as FIG. 4 and the displacement of the arrival position of the laser beam on the image surface on the assumption that the first cylinder lens 128 of the pre-deflection optical system of FIG. 15 is displaced. In this case, $n_d$, $n_H$, and $n_L$ showing the change of the refractive index are defined to the same conditions as the case of FIG. 4.

As is obvious from FIG. 16 and FIGS. 12 to 13, in a case that the embodiment of FIG. 15 is used, there can be provided the pre-deflection optical system, which is substantially the same as the change of the beam diameter of the first embodiment of FIG. 4, by assembling the lenses whose processing is simpler than the the embodiment of FIG. 1. As mentioned in the explanation of FIG. 15, rotation φ around the optical axis of each lens is preferably adjusted to be small.

FIG. 17 shows a modification of the embodiment of FIG. 15. In FIG. 17, the same reference numerals as FIG. 3 are added to the same members, and the specific explanation will be omitted. Table 6 shows the shape of the cylinder lens 226, the material, and position. Similar to FIG. 3, the laser 12 is virtually shown by the light emitting point 12'.

TABLE 6

| curvature | | | | |
|---|---|---|---|---|
| main-scanning direction | sub-scanning direction | distance | material | remarks |
| — | — | 23.397 | air | f = 22.3744 |
| plane | plane | 6.6 | air | |
| plane | 0.00965 | 5 | PMMA | |
| plane | 0.012207 | 44.8 | air | |
| plane | plane | 5 | BK7 | |
| | | 333.9 | air | |

According to FIG. 17, a pre-deflection optical system 214 includes a finite lens 22, an aperture stop 24, and a cylinder lens 226, which are provided in order from the side close to a light source 12'.

In the cylinder lens 226, a first (plastic) cylinder lens 230 formed of PMMA and a second cylinder lens 228 formed of optical glass such as BK 7 are arranged in order opposite to the order of FIG. 15. The aperture stop 24 is adhered to the incident surface (plane) of the first cylinder lens 230.

Figure 18:
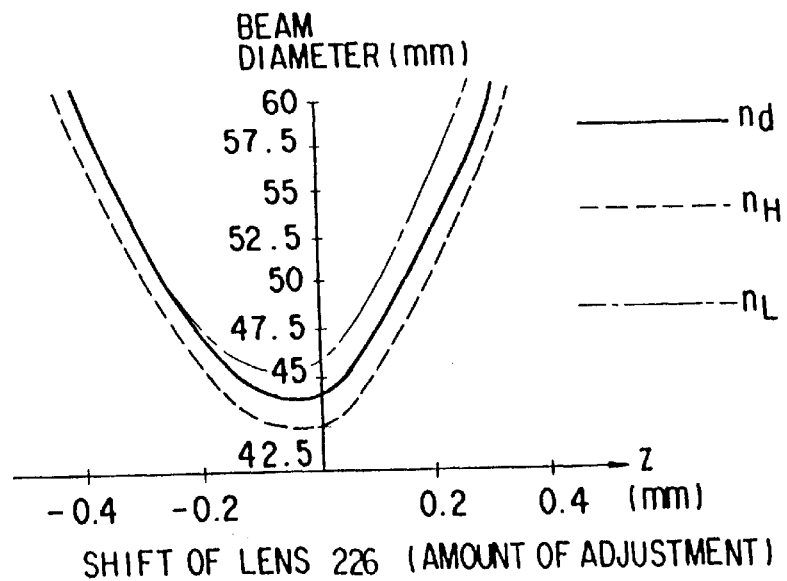
FIG. 18 is a graph showing a beam diameter in the sub-scanning direction at the central portion of a theoretical image formation surface in the pre-deflection optical system of the laser exposing unit of FIG. 17 when a shift of the position of a cylinder lens and a refractive index are varied by the change of temperature or humidity obtained in the same method as shown in FIG. 4.

FIG. 18 relates to the example of FIG. 17, and shows the change of the beam diameter, which is obtained by the same method as FIG. 16 and the displacement of the arrival position of the laser beam on the image surface. According to FIG. 18, under the conditions of temperature of 30° C.—humidity of 0% ($n_d$), temperature of 50° C.—humidity of 0% ($n_H$), and temperature of 10° C.—humidity of 100% ($n_L$), there is shown the variation of the beam diameter of the sub-scanning direction corresponding to the amount of shift of the cylinder lens 228. A solid line shows temperature of 30° C.—humidity of 0%, a broken line shows temperature of 50° C.—humidity of 0%, and one dotted chain line shows temperature of 10° C.—humidity of 100%.

Figure 19:
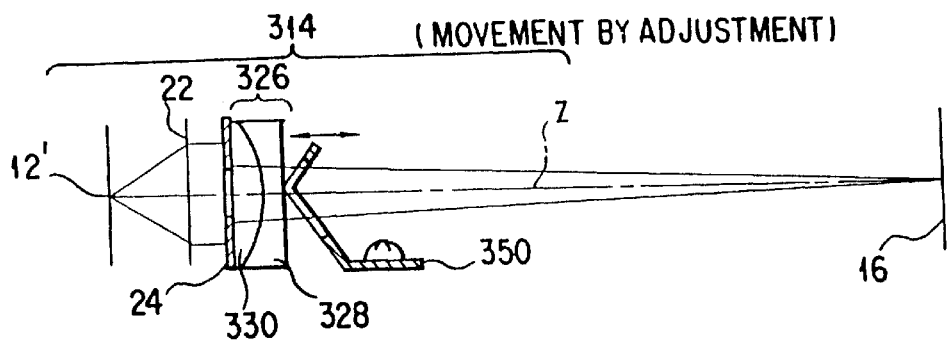
FIG. 19 is a view of an optical path showing further another embodiment of the pre-deflection optical system of FIG. 3.

FIG. 19 shows another modification of the pre-deflection optical system of FIG. 3. In FIG. 19, the same reference numerals as FIG. 3 are added to the same members, and the specific explanation will be omitted. Table 7 shows the shape of the cylinder lens 326, the material, and position. Similar to FIG. 3, the laser 12 is virtually shown by the light emitting point 12'.

TABLE 7

| curvature | | | | |
|---|---|---|---|---|
| main-scanning direction | sub-scanning direction | distance | material | remarks |
| — | — | 16.5429 | air | f = 15.82 |
| plane | plane | 9.3 | air | |
| plane | .0311909 | 5 | SF12 | |
| plane | plane | 5 | PMMA | |
| | | 136.6 | air | |

According to FIG. 19, a pre-deflection optical system 314 includes a finite lens 22, an aperture stop 24, and a cylinder lens 326, which are provided in order from the side close to a light source 12'.

In the cylinder lens 326, a first cylinder lens 330 formed of optical glass such as SF12 and a second cylinder lens 328 formed of PMMA and having curvature whose absolute value is equal to the first cylinder lens 330 are provided to be adhered to each other through a plate spring 350. In this case, the cylinder lenses 328 and 330 are separately formed. Since the cylinder lenses 328 and 330 have curvature whose absolute value is equal to each other, the cylinder lenses 328 and 330 are fixed by pressure of the plate spring 350 such that the generating profile (meridian) of the respective lens surfaces are parallel to each other. On the other hand, it is needless to say that there is formed an opening for passing the laser beam from the light emitting point 12' in the vicinity of the center of the optical axis of the plate spring 350.

Figure 20:
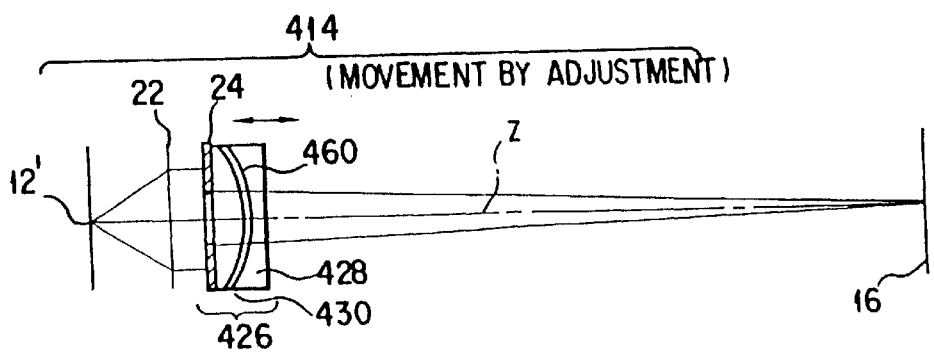
FIG. 20 is a view of an optical path showing a modification of the pre-deflection optical system of FIG. 19.

FIG. 20 shows the modification of the pre-deflection optical system of FIG. 19.

According to FIG. 20, a pre-deflection optical system 414 includes a finite lens 22, an aperture stop 24, and a cylinder lens 426, which are provided in order from the side close to a light source 12'.

In the cylinder lens 426, a first cylinder lens 430 (substantially equal to the cylinder lens 330 of FIG. 19) formed of optical glass such as SF12 and a second cylinder lens 428 (substantially equal to the second cylinder 328 of FIG. 19) formed of PMMA and having curvature whose absolute value is equal to the first cylinder lens 428 are provided to be adhered to each other through a resin adhesion 460 of n=1.68325.

Figure 21:
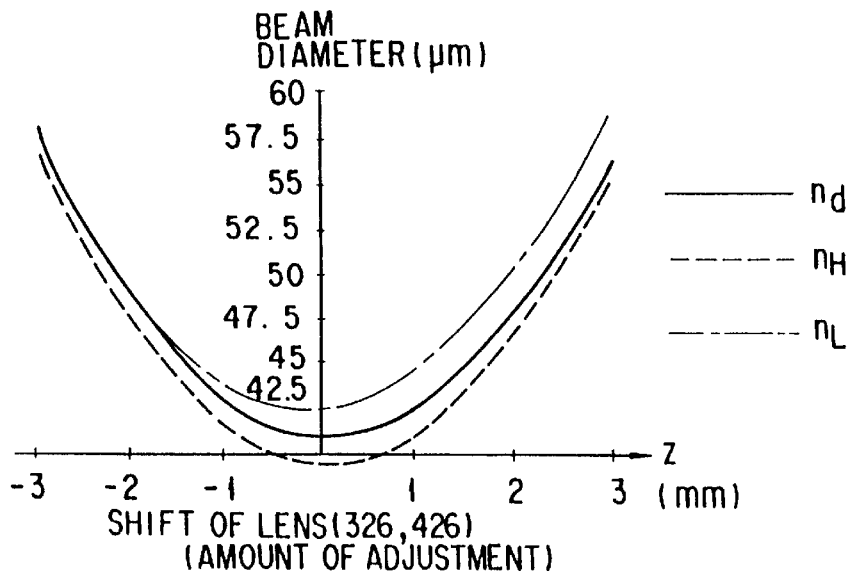
FIG. 21 is a graph showing a beam diameter in the sub-scanning direction at the central portion of a theoretical image formation surface in the pre-deflection optical system of the laser exposing unit of FIG. 19 when a shift of the position of a cylinder lens and a refractive index are varied by the change of temperature or humidity obtained in the same method as shown in FIG. 4.

FIG. 21 shows the change of the beam diameter, which is obtained by the same method as FIG. 4 and the displacement of the arrival position of the laser beam on the image surface on the assumption that the first and second cylinder lenses 330 and 328 of the pre-deflection optical system 314 of FIG. 19 are integrally displaced. In this case, $n_d$, $n_H$, and $n_L$ showing the change of the refractive index are defined to the same conditions as the case of FIG. 4.

As is obvious from FIGS. 21 and 26, in a case that the embodiment of FIG. 19 is used, there can be provided the pre-deflection optical system, which is substantially the same as the change of the beam diameter of the first embodiment of FIG. 4, by assembling the lenses whose processing is simpler than the the embodiment of FIG. 3. In addition, in the example shown in FIG. 20, substantially the same result is obtained. In this case, in evaluation, the thickness of the second cylinder lens 428 is calculated by subtracting the thickness of the first cylinder lens 430 and that of the adhesion 460 from that of the cylinder lens 426.

Figure 22:
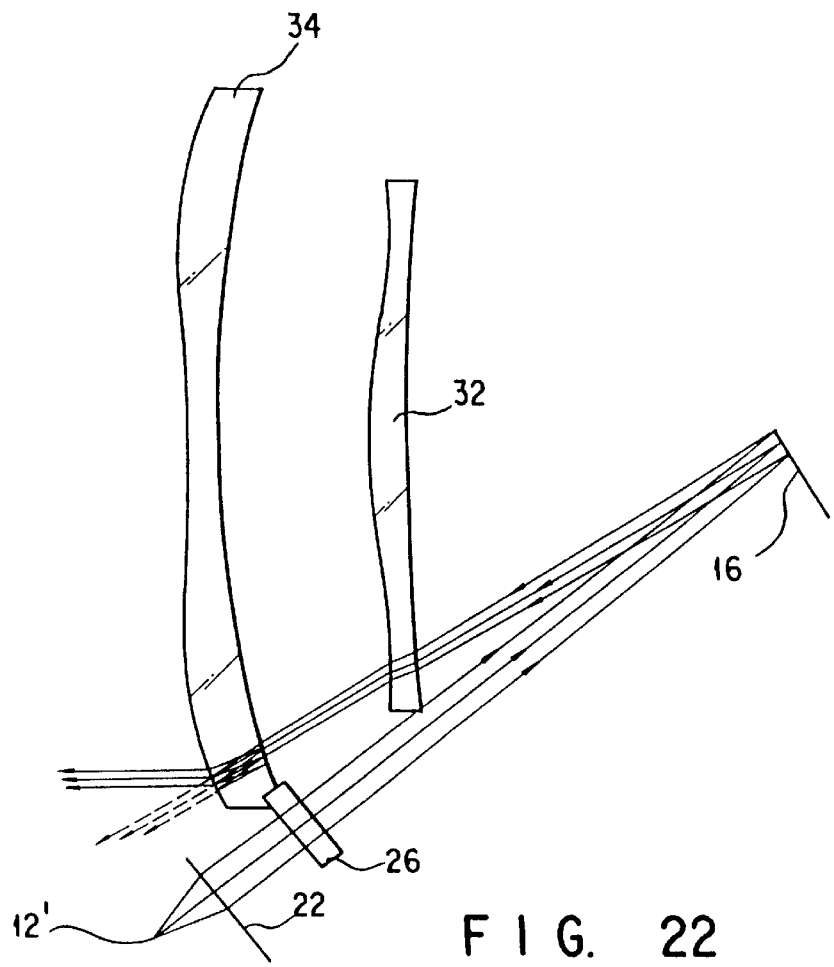
FIG. 22 is a schematic view of an optical path showing a principle in which a ghost laser beam is generated by the laser exposing unit of FIG. 1.

FIG. 22 shows the reason a ghost (laser) beam is generated when the laser beam, which is passed through the second fθ lens 34, is reflected upon the emission plane of the lens 34, reflected upon the incident plane, that is, toric surface again, and emitted.

According to FIG. 22, in the second fθ lens 34, the incident plane is formed on the toric surface. Due to this, FIG. 22 shows that a part of the laser beam, which is reciprocated between the incident plane and the emission plane, may be directed to the image forming area of the image surface S, that is, photosensitive drum 51.

Figure 23A:
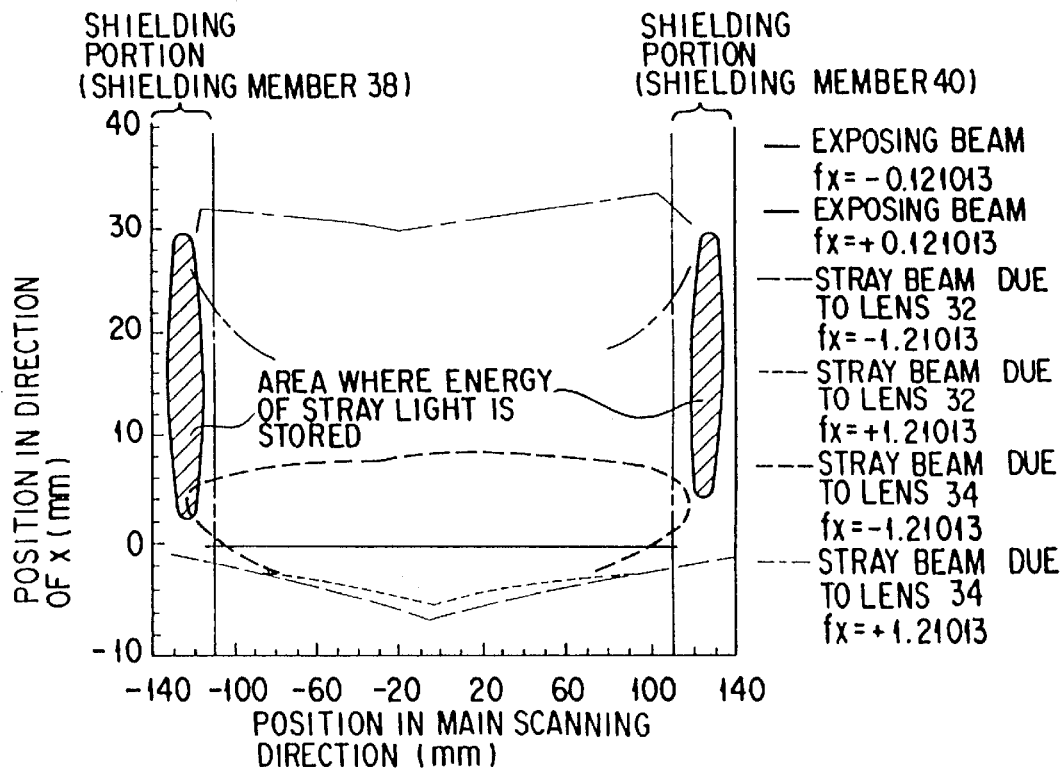
FIGS. 23A and 23B are a coordinate distribution view showing a position where the ghost beam is generated by the laser exposing unit of FIG. 1.
Figure 23B:
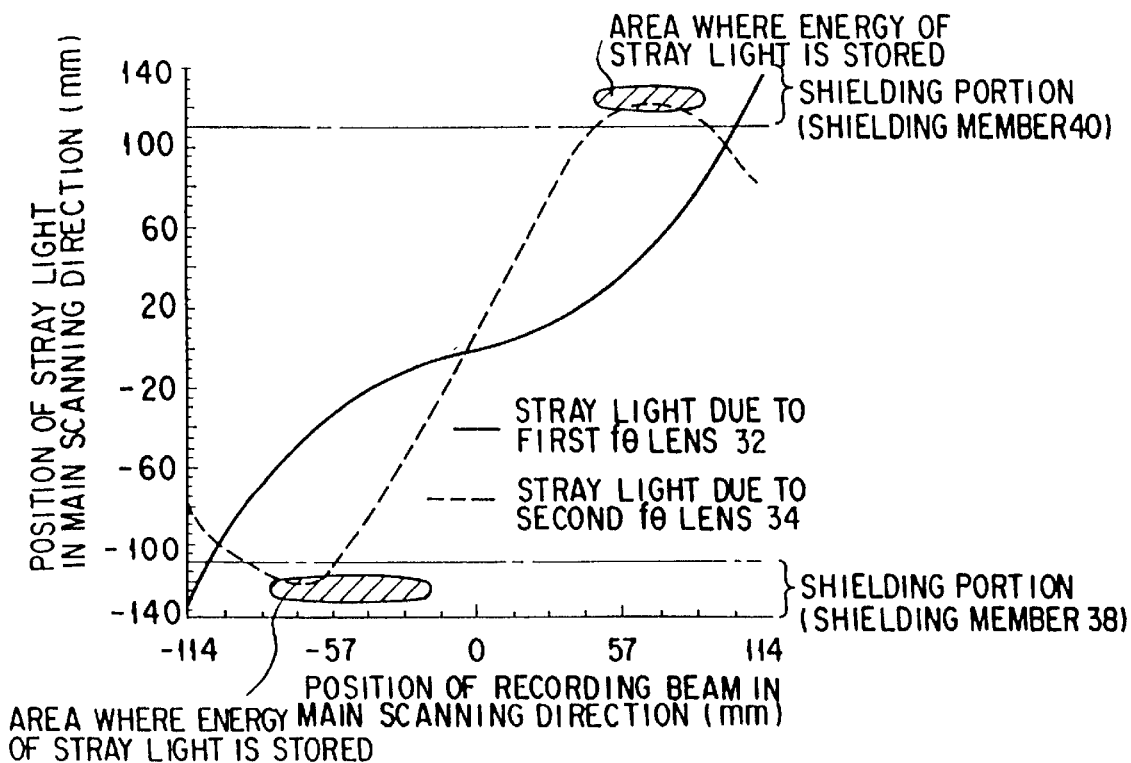

FIGS. 23A and 23B show the position where the ghost beam generated as explained in FIG. 22 is arrived. The respective lines show the position where the laser beam of FIG. 3 is passed through the the finite lens 22, $f_x=0.121013$ shows the upper limit of the light beam, and $f_x=-0.121013$ shows the lower limit of the light beam.

According to FIG. 23A, the ghost beam, which is reciprocated between the incident plane and the emission plane of each of the first and second fθ lenses 32 and 34, is presented to have a width in a state that the ghost beam is relatively separated in the direction of x axis as compared with the position where the exposing beam (laser beam) is arrived.

In contrast, as is obvious from FIG. 23B, there has been known that the ghost beam, which is generated by the incident plane of the second fθ lens 34, is temporarily stopped by influence of the shape of the incident plane and the rotation angle of the deflecting device 16. In this case, if the position of the exposing beam is set to the horizontal axis and the position of the ghost beam is set to the vertical axis, maximum and minimum values appear at the curvature showing the position where the ghost beam is arrived.

Due to this, in printing by the exposing beam in which the curvature of the ghost beam shows the maximum and minimum value in FIG. 23B, although energy of the ghost beam is about 0.2% of the exposing beam, energy is stored, so that the change of density may be provided to an image having relatively low density, e.g., half tone image.

For this reason, as shown in FIG. 1, shielding members 38 and 40 are arranged at a position where a shadow is cast on the image area close to the both end portions of the image surface S (photosensitive drum). Also, the distribution of the first derivative of the incident plane of the second fθ lens 34 is made suitably in order to shield the area where the ghost beam is stopped by the shielding members 38 and 40. In the shielding members 38 and 40, it is needless to say that the shape of the exposing slit (not shown), which is used when the exposing beam is radiated onto the photosensitive drum, may be deformed.

FIG. 24 shows a laser exposing unit, which is different from the laser exposing unit of FIG. 1.

A laser exposing unit 510 includes a semiconductor laser for generating a laser beam (which is shown by light emitting point 512' similar to FIGS. 1, 15 to 19), a deflecting device 516, a light source side (pre-deflection) optical system 514, a plane mirror 520, and an image surface side (post-deflection) optical system 518. The deflecting device 516 is used to scan the laser beam emitted from the light emitting point 512' in a direction substantially parallel to an axis (not shown) of the photosensitive drum 51 (only the position where the laser beam is image-formed is virtually shown by image surface S), i.e., the main-scanning direction. The light source side (pre-deflection) optical system 514 is provided between the laser 512 and the deflecting device 516 to set the beam diameter of the laser beam directing to the deflecting device 516 to a predetermined size. The plane mirror 520 is provided between the deflecting device 516 and the photosensitive drum 51 (image surface S) to return the laser beam deflected by the deflecting device 516 to photosensitive drum S. The image surface side (post-deflection) optical system 518 image-forms the the laser beam, which is deflected by the deflecting device 516, and returned by the plane mirror 520, under the condition substantially equal to any positions along the axis (not shown) of the photosensitive drum 51. Since the respective elements are substantially the same as the laser exposing unit 10, the specific explanation will be omitted.

According to the laser exposing unit 510 of FIG. 24, the plane area 520 is provided in an area, which is close to the deflecting device 516, and has a narrow width of the beam scanning area. Due to this, the size required in the plane mirror 520 does not substantially increase the size of the laser exposing unit 510. As compared with the laser exposing unit 10 of FIG. 1, the distance between the deflecting device 516 and the photosensitive drum 51 (image surface S) can be largely reduced. Therefore, there can be provided a compact laser exposing unit.

As explained above, according to the laser exposing unit, the first and second fθ lenses cooperate with each other and have complementarily functions, so that many properties such as curvature of the laser beam arrived at the photosensitive drum, fθ characteristic, property of correcting tilt, or linearity can be improved. In addition, by defining the synthetic focal distance between the first and second fθ lenses to be within a predetermined range, the post-deflection optical system including the plastic lens in which the focal distance is varied by the change of the temperature or humidity can be used to perform aberration correction for correcting the deformation aberration or the filed curve.

As mentioned above, according to the present invention, the lens of the laser beam exposing unit used in the laser beam printer is replaced with the plastic lens in which the change of the refractive index due to the change of the temperature or that of humidity is optimized, thereby the device can be lightened and miniaturized. Also, since the number of lenses can be reduced, the manufacturing cost of the device is lowered.

Moreover, even in a case that the number of reflecting surfaces is increased for high speed performance of the deflecting device, the distance between the deflecting device and the image forming surface is reduced since the deflecting angle can be reduced. Thereby, there can be provided a compact laser exposing unit.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An exposing apparatus for exposing a light beam on an image bearing member having an image forming area, comprising:

a light source;

first optical lens means for converting the light beam from the light source into a convergent light beam;

scanning means for scanning the light beam from the first optical lens means in a scanning direction toward the image bearing member;

a first lens, provided within an optical path between the scanning means and the image bearing member, for correcting for a variation of an arrival position of the light beam from the scanning means; and a second lens, provided within the optical path between the first lens and the image bearing member, for correcting for a variation of an arrival position of the light beam passing through the first lens; and the first optical lens means having a lens power in the scanning direction such that a distance, between a scanning point of the scanning means and an image forming point where light from the scanning means is image-formed at a center of an image forming area when the first lens and second lens are replaced with a plane with no power, is shorter than a distance between the scanning point of the scanning means and an end portion of the image bearing member.

2. An exposing apparatus according to claim 1, wherein the first optical lens means has power in the scanning direction such that an optical path length between a scanning point of the scanning means and a lens where light scanned by the scanning means is image-formed at a center of the image forming area when the first and said second lens are replaced with said plane is longer than a distance between the scanning point of the scanning means and a center portion of the image bearing member.

3. An exposing apparatus for exposing a light beam on an image bearing member by scanning with the light beam in a first direction, comprising:

a light source;

first optical lens means for converting the light beam from the light source into a convergent light beam;

scanning means for scanning the light beam from the first optical lens means toward the image bearing member;

a first lens, provided within an optical path between the scanning means and the image bearing member; and a second lens, provided within the optical path between the first lens and the image bearing member; and each of the first and second lens having a beam incident surface and a beam emission surface, and each surface of said first lens and said second lens having a generating profile z=g(y), wherein z is a distance along an optical axis and y is a distance between one end and another end of the first and second lenses along the first direction, wherein a relative magnitude relation of a first derivative of the beam incident lens surface and the beam emission lens surface of the first lens and a relative magnitude relation of a first derivative of the beam incident lens surface and the beam emission lens surface of the second lens have inverse properties, and a relative magnitude relation of a second derivative $d^2z/dy^2$ of the beam incident lens surface and the beam emission lens surface of the first lens and a relative magnitude relation of a second derivative of the beam incident lens surface and the beam emission lens surface of the second lens are opposite to a value of y corresponding to each position where the light beam of a same scanning angle passes.

4. The apparatus according to claim 3, wherein the second lens includes at least one toric surface having a meridian shaped to be asymmetrical to an optical axis of the toric surface.

5. The apparatus according to claim 4, wherein the first and second lenses are arranged such that the optical axis of the beam emission surface of the first lens inclines with respect to an optical axis of the beam incident surface of the first lens and the optical axis of the beam emission surface of the second lens inclines with respect to the optical axis of the beam incident surface of the first lens.

6. The apparatus according to claim 4, wherein the first and second lenses are arranged such that an optical axis of the beam emission surface of the first lens is displaced with respect to the optical axis of the beam incident surface of the first lens and the optical axis of the beam emission surface of the second lens inclines with respect to the optical axis of the beam incident surface of the first lens.

7. The apparatus according to claim 4, wherein the first and second lenses are arranged such that the optical axes of the beam emission surfaces of each of the first and second lenses are displaced with respect to the optical axis of the beam incident surface of the second plastic lens, and wherein the optical axis of the beam emission surface of the first lens has a predetermined inclination with respect to the optical axis of the beam incident surface of the second lens.

8. An exposing apparatus for exposing a light beam on an image bearing member having an image forming area, comprising:

a light source;

first optical lens means for converting the light beam from the light source into a convergent light beam;

scanning means for scanning the light beam from the first optical lens means toward the image bearing member;

second optical lens means including a first lens having a first beam incident surface and a first beam emission surface, formed to be spherical and aspherical, respectively, a second lens having a second beam incident surface formed to be toric and a second beam emission surface formed to be aspherical, wherein each optical axis of each surface passing through each of the surfaces other than the toric surface is displaced along a direction perpendicular to a plane including the light generated by said scanning means along a first direction.

9. An exposing apparatus for exposing a light beam on an image bearing member by scanning the light beam in a first direction, comprising:

a light source;

first optical lens means for converting the light beam from the light source into a convergent light beam, the first optical lens means having a glass lens, a plastic cylinder lens having negative lens power in only a second direction perpendicular to the first direction, and a glass cylinder lens having positive lens power in only the second direction;

scanning means for scanning the light beam from the first optical lens means toward the image bearing member;

a first lens, provided within an optical path between the scanning means and the image bearing member, for correcting for a variation of the arrival position of the light beam from the scanning means; and a second lens, provided within the optical path between the first lens and the image bearing member, for correcting for a variation of the arrival position of the light beam passing through the first lens.

10. The apparatus according to claim 9, wherein the plastic cylinder lens has absolute values of curvature equal to absolute values of curvature of the glass cylinder lens.

11. The apparatus according to claim 9, wherein the first lens has a beam incident lens surface and a beam emission lens surface formed to be aspherical and the second lens has incident and emission surfaces formed to be toric and aspherical, respectively, light caused by reflection inside of the second lens provides a maximum value and a minimum value of a locus defined as the light position on the image bearing member in the scanning direction when a main light beam is continuously moved in a scanning direction within an image area, and the maximum and minimum values are positioned at an area other than an image area of the image bearing member.

12. An exposing apparatus according to claim 9 wherein at least one of the first lens and said second lens has a toric surface and a positive lens power in the second direction.

13. The apparatus according to claim 9, wherein the plastic cylinder lens has first and second lens surfaces, having absolute values of curvature equal to each other, and wherein first and second lens surfaces having the same absolute values of curvature are adhered to each other.

14. An exposing apparatus for exposing a light beam on an image bearing member by scanning the light beam in a first direction, comprising:

a light source;

first optical lens means for converting the light beam from the light source into a convergent light beam, the first optical lens means having a glass lens, a plastic cylinder lens having negative lens power in only a second direction perpendicular to a first direction, and a glass cylinder lens having positive lens power in only the second direction;

scanning means for scanning the light beam from the first optical lens means toward the image bearing member; and a first lens, provided within an optical path between the scanning means and the image bearing member; and a second lens, provided within the optical path between the first lens and the image bearing member;

each of the first and second lenses having a beam incident surface and a beam emission surface, and wherein every optical surface of the first lens and said second lens is formed such that an absolute value of a third derivative $d^3z/dy^3$ is smaller than $$\left| \frac{k\omega_0^2 - \sqrt{1.1^2 - 1}}{z} \cdot \frac{f_2^2}{(n-1)(f_2 z_2 + f_2 z_3 - z_2 z_3)^2} \cdot \frac{1}{\Delta} \right|$$

wherein z is a position along a third direction perpendicular to the first and second direction where crossing points of an optical axis of each of surfaces of the first and second surface of said first lens and said second lens are an origin, y is a position along the first direction, $\Delta$ is a tolerance of decentering, $\omega_0$ is a beam west radius in a vicinity of the surface of the image bearing member, $k=2\pi/\lambda$, $\lambda$ is a wavelength of light, n is a refractive index of lens material, $f_2$ is a focal length of a combination of surfaces arranged between one of a beam incident surface and a beam emission surface of each lens, $z_2$ is a distance between one of the beam incident surface and the beam emission surface of each lens surface and an incident side principal plane of a combination of surfaces arranged between an object surface and the image bearing member, $Z_3$ is a distance between the image bearing member surface and an emerging side principal plane of the combination of surfaces arranged between the object surface and the image bearing member and a meridian of each of a lens surfaces of the first lens and said second lens defined by z=g(y).

15. An exposing apparatus for exposing a light beam on an image bearing member having an image forming area, comprising:

a light source;

first optical lens means for converting the light beam from the light source into a convergent light beam;

scanning means for scanning the light beam from the first optical lens means toward the image bearing member;

reflecting means, provided along an optical path between the scanning means and the image bearing member, for reflecting light scanned by the scanning means, thereby reducing a distance between the scanning means and the image bearing member; and second optical lens means, along the optical path provided between the reflecting means and the image bearing member and including an aspherical plastic lens and an aspherical toric lens, for image-forming the light beam scanned by the scanning means.

16. An exposing apparatus for exposing a light beam on an image bearing member having an image forming area, comprising:

a light source;

first optical lens means for converting the light beam from the light source into a convergent light beam, the first optical lens means including an aperture stop;

scanning means for scanning the light beam from the first optical lens means toward the image bearing member; and second optical lens means, provided between the scanning means and the image bearing member, for image-forming the light beam scanned by the scanning means, wherein the aperture stop of the first optical lens means has a polygon-shaped opening having a shape such that the opening has areas outside an ellipse in the vicinity of a scanning axis and areas inside said ellipse in the vicinity of a sub-scanning axis.

* * * * *